United States Patent
Sakhnini et al.

(10) Patent No.: US 12,088,522 B2
(45) Date of Patent: Sep. 10, 2024

(54) EXTENDED DISCOVERY BURST TRANSMISSION WINDOW

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/649,778

(22) Filed: Feb. 2, 2022

(65) Prior Publication Data

US 2022/0247533 A1    Aug. 4, 2022

Related U.S. Application Data

(60) Provisional application No. 63/145,424, filed on Feb. 3, 2021.

(51) Int. Cl.
*H04L 5/00* (2006.01)
*H04W 48/08* (2009.01)

(52) U.S. Cl.
CPC ........... *H04L 5/0048* (2013.01); *H04W 48/08* (2013.01)

(58) Field of Classification Search
None
See application file for complete search history.

(56) References Cited

U.S. PATENT DOCUMENTS 11,368,930 B2 * 6/2022 Kim ............... H04W 56/001
2021/0377883 A1 * 12/2021 Jung ............... H04W 48/10
(Continued)

FOREIGN PATENT DOCUMENTS

| EP | 3972356 A1 | 3/2022 |
| WO | 2020220349 A1 | 11/2020 |
| WO | 2020230864 A1 | 11/2020 |

OTHER PUBLICATIONS

International Search Report and Written Opinion—PCT/US2022/015124—ISA/EPO—May 11, 2022.
(Continued)

*Primary Examiner* — Hong S Cho
(74) *Attorney, Agent, or Firm* — Procopio, Cory, Hargreaves & Savitch LLP

(57) ABSTRACT

A base station may schedule a plurality of synchronization signal blocks (SSBs) in an extended discovery burst (DRS) transmission window including a plurality of candidate SSBs including at least two candidate SSBs with a same SSB beam index, and transmit the plurality of SSBs based on the scheduling of the plurality of SSBs in the extended DRS transmission window. A UE may monitor for a plurality of SSBs in the extended DRS transmission window including the plurality of candidate SSBs including at least two candidate SSBs with the same SSB beam index, and perform measurements based on SSBs of the plurality of SSBs received from the base station. The base station may transmit a signal indicating one or more scheduling parameters of the plurality of SSBs, and the UE may determine SSB index of each candidate SSB of the plurality of candidate SSBs.

26 Claims, 16 Drawing Sheets

(56) References Cited

U.S. PATENT DOCUMENTS

2022/0022072 A1    1/2022  Jiang et al.
2022/0150800 A1*   5/2022  Harada .................. H04L 5/0053

OTHER PUBLICATIONS

Nokia, et al., "On DL Signals and Channels for NR-U", 3GPP Draft, 3GPP TSG RAN WG1 Meeting #95, R1-1812696, 3rd Generation Partnership Project (3GPP), Mobile Competence Centre, 650, Route Des Lucioles, F-06921 Sophia-Antipolis Cedex, France, Nov. 2, 2018 (Nov. 2, 2018), pp. 1-21, XP051478940, Retrieved from the Internet: URL: http://www.3gpp.org/ftp/tsg%5Fran/WG1%5FRL1/TSGR1%5F95/Docs/R1%2D1812696%2Ezip Sections 2.2 and 2.4, figures 2-4.

Potevxo: "Discussion on Initial Access Procedure for NR-U", 3GPP Draft, 3GPP TSG RAN WG1 #97, R1-1907365, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728803, 5 Pages, Retrieved from the Internet: URL: http://www.3gpp.org/ftp/Meetings%5F3GPP%5FSYNC/RAN1/Docs/R1%2D1907365%2Ezip [Retrieved on May 13, 2019] Section 2.2.

* cited by examiner

EXTENDED DISCOVERY BURST TRANSMISSION WINDOW

CROSS REFERENCE TO RELATED APPLICATION(S)

This application claims the benefit of and priority to U.S. Provisional Application Ser. No. 63/145,424, entitled "METHOD AND APPARATUS FOR PROVIDING EXTENDED DISCOVERY BURST TRANSMISSION WINDOW" and filed on Feb. 3, 2021, which is expressly incorporated by reference herein in its entirety.

TECHNICAL FIELD

The present disclosure relates generally to communication systems, and more particularly, to a method of wireless communication including an extended discovery burst (DRS) transmission window for transmitting a plurality of synchronization signal blocks (SSBs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a UE. The base station may schedule a plurality of SSBs in an extended DRS transmission window including a plurality of candidate SSBs including at least two candidate SSBs with a same SSB beam index, and transmit the plurality of SSBs based on the scheduling of the plurality of SSBs in the extended DRS transmission window. The UE may monitor for a plurality of SSBs in the extended DRS transmission window including the plurality of candidate SSBs including at least two candidate SSBs with the same SSB beam index, and perform measurements based on SSBs of the plurality of SSBs received from the base station. The base station may transmit a signal indicating one or more scheduling parameters of the plurality of SSBs, and the UE may determine SSB index of each candidate SSB of the plurality of candidate SSBs.

In one aspect, the extended DRS transmission window may include multiple sub-DRS transmission windows, each of the multiple sub-DRS transmission windows including at least one transmission of each of the plurality of SSBs. The base station may schedule to transmit a pattern of SSBs that is repeated in each sub-DRS transmission window of the extended DRS transmission window. The UE may determine the SSB index of each candidate SSB of the plurality of candidate SSBs based on a modulo function that is based on a candidate SSB index and a number of candidate SSBs within each sub-DRS transmission window. The one or more parameters may include one or more of the number of candidate SSBs within each of the sub-DRS transmission windows, a sub-DRS window length, or a number of sub-DRX transmission windows within the extended DRS transmission window.

In another aspect, the plurality of candidate SSBs may include N sets of candidate SSBs, N being an integer number greater than or equal to 2, and the base station may repeat transmission of a pattern of SSBs in the extended DRS transmission window. The UE may determine the SSB index of each candidate SSB of the plurality of candidate SSBs using a modulo function based on a candidate SSB index and a number of SSBs within the pattern of SSBs. The one or more parameters may include one or more of the integer N or the number of SSBs within the pattern of SSBs.

In another aspect, the plurality of SSBs may include a pattern of SSBs, and the base station may sequentially repeat transmission of each SSB of the pattern of SSBs N times within the pattern of SSBs, N being an integer number greater than or equal to 2. For example, the base station may transmit a first SSB and a repetition of the first SSB prior to transmitting a second SSB within the extended DRS transmission window. The UE may determine the SSB index of each candidate SSB of the plurality of candidate SSBs using a modulo function that is based on a floor of a candidate SSB index divided by N, and a number of SSBs within the pattern of SSBs. The one or more parameters may include one or more of the integer N or the number of SSBs within the pattern of SSBs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few

DETAILED DESCRIPTION

Figure 1:
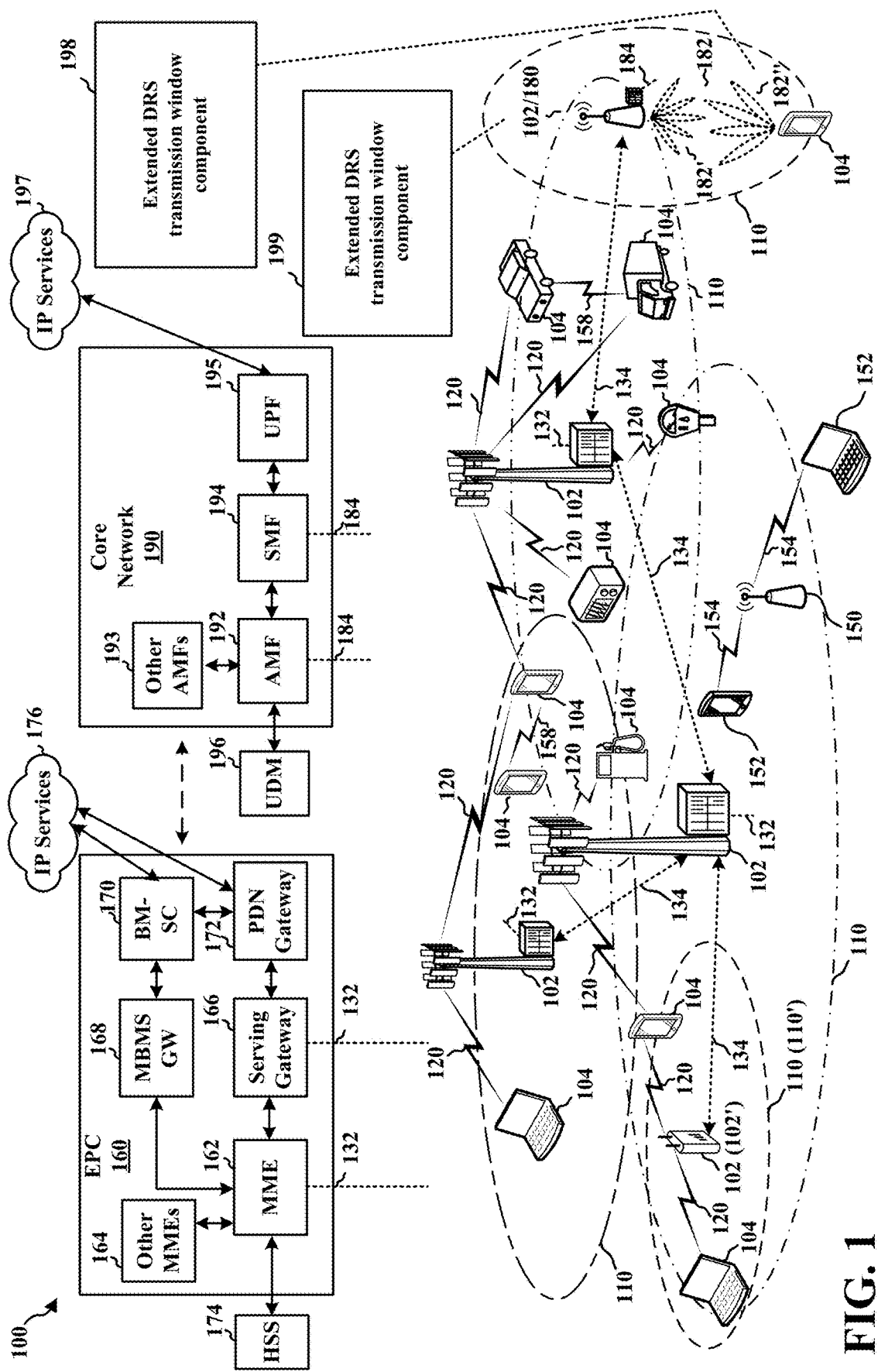
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an extended DRS transmission window component 198 configured to monitor for a plurality of SSBs in an extended DRS transmission window including a plurality of candidate SSBs including at least two candidate SSBs with a same SSB beam index, and perform measurements based on SSBs of the plurality of SSBs received from a base station. In certain aspects, the base station 180 may include an extended DRS transmission window component to schedule a plurality of SSBs in an extended DRS transmission window including a plurality of candidate SSBs including at least two candidate SSBs with a same SSB beam index, and transmit the plurality of SSBs based on the scheduling of the plurality of SSBs in the extended DRS transmission window. Although the following description may be focused on 5G NR, the concepts described herein may be applicable to other similar areas, such as LTE, LTE-A, CDMA, GSM, and other wireless technologies.

Figure 2:
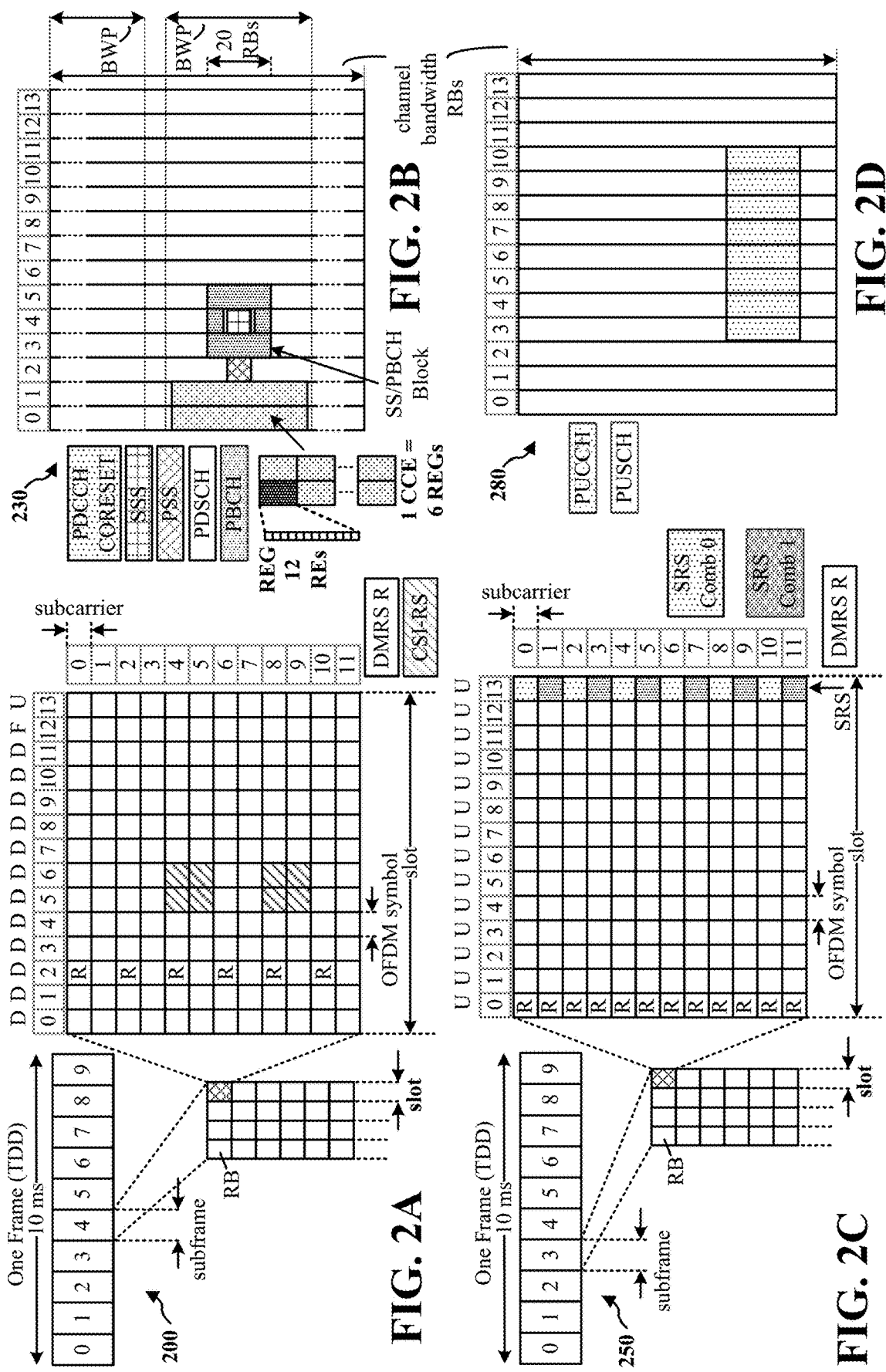
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
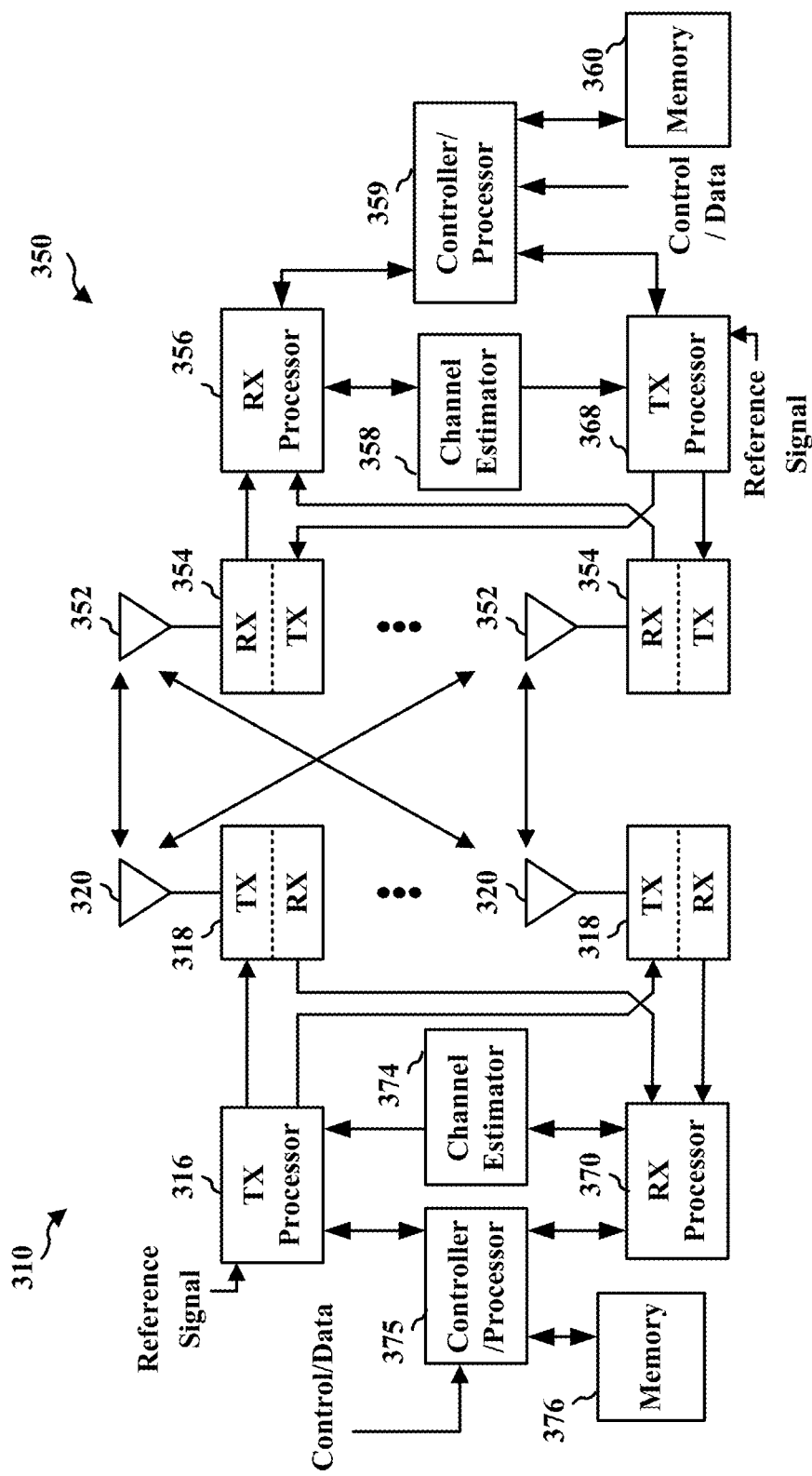
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4B:
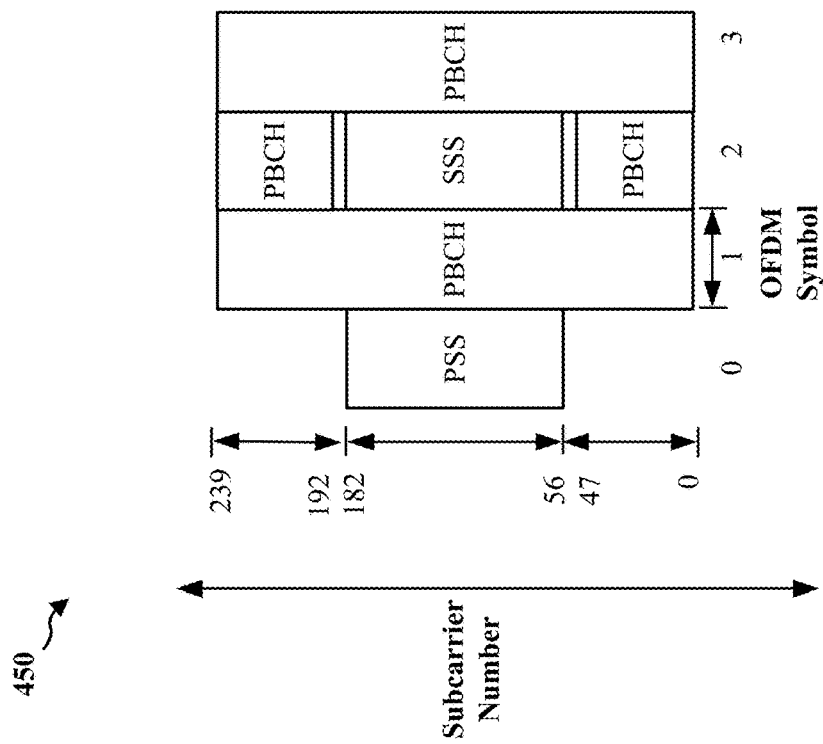
FIG. 4B illustrates an example SSB.
Figure 4A:
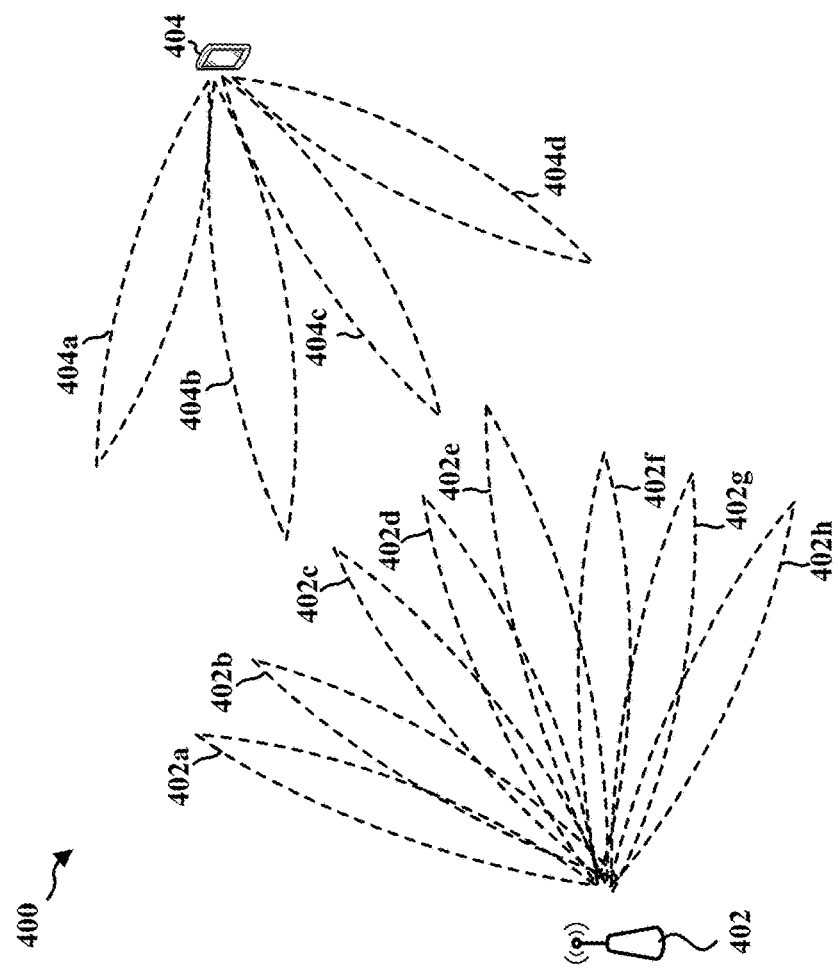
FIG. 4A is a diagram illustrating a base station in communication with a UE.

FIG. 4A is a diagram 400 illustrating a base station 402 in communication with a UE 404. Referring to FIG. 4A, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. In some aspects, the beamformed signal transmitted by the base station 402 may include an SSB, such as described in connection with FIG. 2B.

In response to different conditions, such as a DCI for beam updating provided herein, the UE 404 may determine to switch beams, e.g., between beams 402a-402h or may determine that the base station will switch between beams. The beam at the UE 404 may be used for the reception of downlink communication and/or transmission of uplink communication. The beam at the base station 402 may be used for uplink reception and/or downlink transmission. In some examples, the base station 402 may send a transmission that triggers a beam switch by the UE 404.

In addition to a 120 kHz SCS used in some wireless communication systems, other SCS, such as 240 kHz, 480 kHz, and 960 kHz SCS may be used for wireless communication. In some aspects, a maximum bandwidth may be defined for wireless communication in a corresponding frequency range, e.g., for transmission/reception of data, control channels, and/or reference signals. In some aspects, a normal cyclic prefix (NCP) may be supported for the SCS. For example, in certain high-frequency ranges, such as between 52.6 GHz and 71 GHz, an SCS of 240 kHz, 480 kHz, and/or 960 kHz may be used for SSB transmission by the base station 402 for initial access related signals/channels in an initial bandwidth part (BWP), and/or for SSB for non-initial access scenarios. In some aspects, the base station may transmit up to 64 SSB beams, e.g., using the licensed spectrum and/or the unlicensed spectrum in a frequency range, such as between 52.6 GHz and 71 GHz. In some aspects, an SCS of 240 kHz, 480 kHz, and/or 960 kHz may be used for SSB transmission, and an additional SCS of an SCS of 480 kHz and/or 960 kHz may be used for signals and/or channels related to initial access in an initial BWP. In some aspects, an SCS of 480 kHz and/or 960 kHz may be used for SSB for wireless communication operations other than initial access. In some aspects, a common framework may be applied for 480 kHz and/or 960 kHz. Different PRACH sequence lengths, such as L=139, L=571, and L=1151, may be additionally supported. The base station and UE may also support a configuration for non-consecutive ROs in a time domain for operation in a shared spectrum.

In some wireless communication systems, a base station may transmit an SSB that receiving UEs may use for an initial cell search. FIG. 4B illustrates an example SSB 450. The SSB spans 4 OFDM symbols with one (1) symbol for PSS, two (2) symbols for PBCH, and one (1) symbol with SSS and PBCH frequency domain multiplexed with each other. By way of example, in some wireless communication systems, an SCS of 15 kHz or 30 kHz may be used for FR1, and an SCS of 120 kHz or 240 kHz may be used for FR2. The PSS may use a length 127 frequency domain-based M-sequence (mapped to 127 subcarriers). For example, the PSS may have three (3) possible sequences. The SSS may use a length 127 frequency domain-based Gold Code sequence (2 M-sequences) (mapped to 127 subcarriers). By way of example, there may be a total of 1008 possible sequences for the SSS. The PBCH may be QPSK modulated, and the UE may coherently demodulate the PBCH using an associated DM-RS from the base station.

Figure 5A:
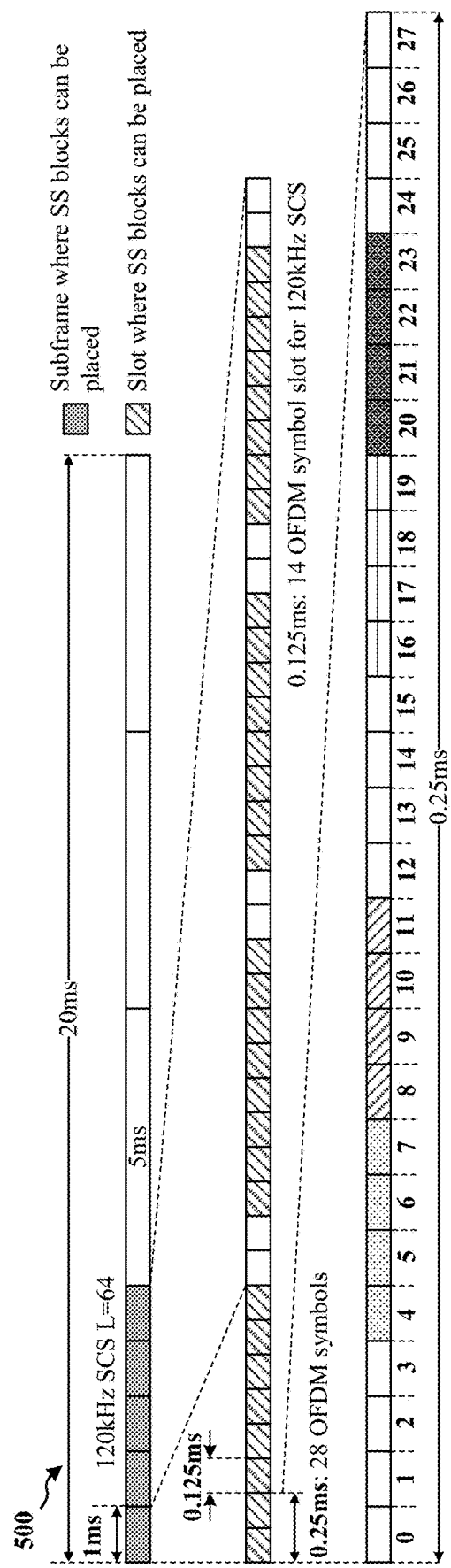
FIGS. 5A and 5B illustrate example SSB patterns.
Figure 5B:
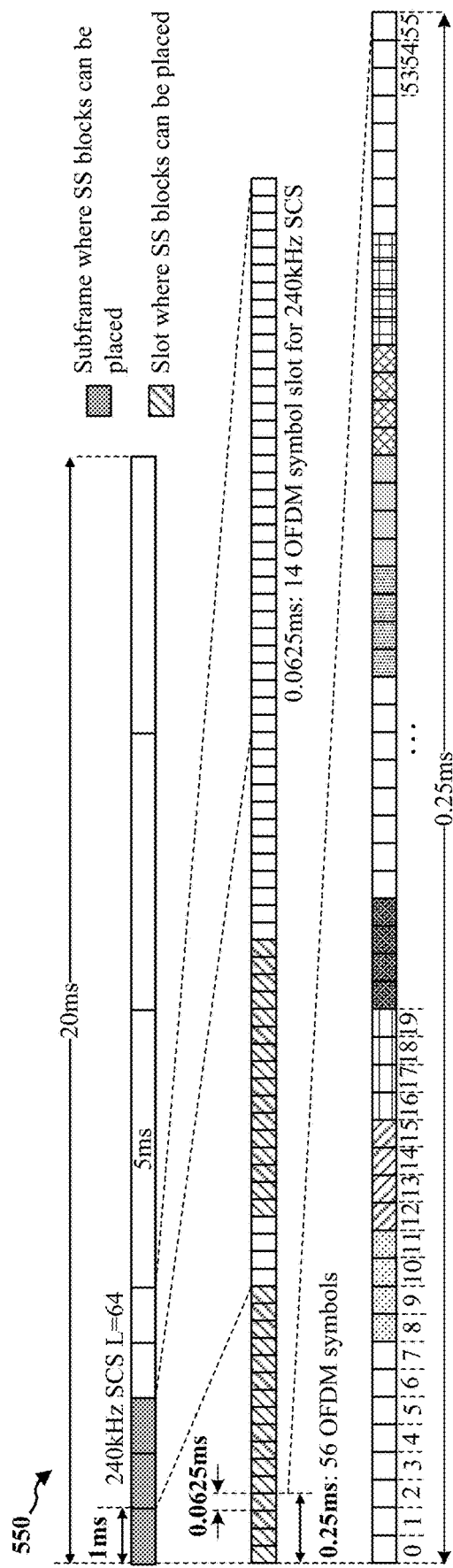

FIGS. 5A and 5B illustrate example SSB patterns, e.g., for transmission using FR2. As illustrated in example 500 of FIG. 5A, for 120 kHz SCS and PRACH sequence length L=64, within 20 ms, there may be twenty 1 ms subframes. Each 1 ms subframe may include eight 0.125 ms slots, and each 0.25 ms period may include 28 OFDM symbols. SSBs may be placed on particular, defined subframes/slots. In one example, within a 0.25 ms period, the two slots may include SSBs and OFDM symbols 4-7 may be associated with a first SSB, OFDM symbols 8-11 may be associated with a second SSB, OFDM symbols 16-19 may be associated with a third SSB, and OFDM symbols 20-23 may be associated with a fourth SSB.

As illustrated in example 550 of FIG. 5B, for 240 kHz SCS and PRACH sequence length L=64, within 20 ms, there may be twenty 1 ms subframes. Each 1 ms subframe may include sixteen 0.0625 ms slots, and each 0.25 ms period may include 56 OFDM symbols. SSBs may be placed on certain defined subframes/slots. In one example, within a 0.25 ms period, the four slots may include SSBs and OFDM symbols 8-11 may be associated with a first SSB, OFDM symbols 12-15 may be associated with a second SSB, OFDM symbols 16-19 may be associated with a third SSB, OFDM symbols 20-23 may be associated with a fourth SSB, OFDM symbols 32-35 may be associated with a fifth SSB, OFDM symbols 36-39 may be associated with a sixth SSB, OFDM symbols 40-43 may be associated with a seventh SSB, and OFDM symbols 44-47 may be associated with an eighth SSB.

In some aspects, a maximum DRS transmission window duration may be 5 ms, and the DRS transmission window duration may be configured as 0.5, 1, 2, 3, 4, or 5 ms. In one aspect, if the DRS transmission window duration is not known, a UE may assume that the DRS transmission window has a duration of 5 ms by default. In some aspects, the maximum number of SSBs in the cell may be eight (8), and the maximum number of candidate SSBs within a DRS transmission window may be 10 for SCS=15 kHz and 20 for SCS=30 kHz.

In some aspects, for operation with shared spectrum channel access (i.e., NR in an unlicensed spectrum or NR-U), a UE may assume that transmission of SSBs by a base station in a half-frame is within a discovery burst transmission window (DRS tx window) that starts from the first symbol of the first slot in the half-frame.

In some aspects, the base station may perform a listen-before-talk (LBT) procedure before transmitting each SSB in a shared frequency spectrum, such as an unlicensed spectrum, in order to access the channel and ensure that the transmission of each SSB does not collide with other data transmissions. That is, the base station may listen for transmissions from other wireless devices and determine whether the downlink channel is available for transmitting each SSB. The base station may then transmit the SSB based on the determination that the downlink channel is available for transmission. Accordingly, if the base station determines that there is a collision, the base station may not transmit the colliding SSB at a candidate position. The omitted SSB may be transmitted on the next SSB candidate occasion corresponding to the same beam or QCL as the omitted SSB. In one aspect, the SSB pattern may be configured that the SSB is transmitted only during the first half-frame, and the omitted SSB may not be transmitted until the next DRS tx window. Referring again to example 500 of FIG. 5A, if the base station fails to transmit the first SSB in the OFDM symbols 4-7 due to collision and failure to clear LBT, the base station may wait 20 ms to retransmit the first SSB. Referring again to example 550 of FIG. 5B, if the base station fails to transmit the first SSB in the OFDM symbols 8-12 due to collision and failure to clear the LBT, the base station may need to wait 20 ms to retransmit the first SSB.

In some aspects, to provide more reliability in the SSB delivery with medium uncertainty, more candidate SSBs for one or more beam or QCL may be introduced within the DRS tx window. For example, out of the SSB candidate positions, multiple wraparound tx opportunities may be provided for each SSB QCL.

Figure 6:
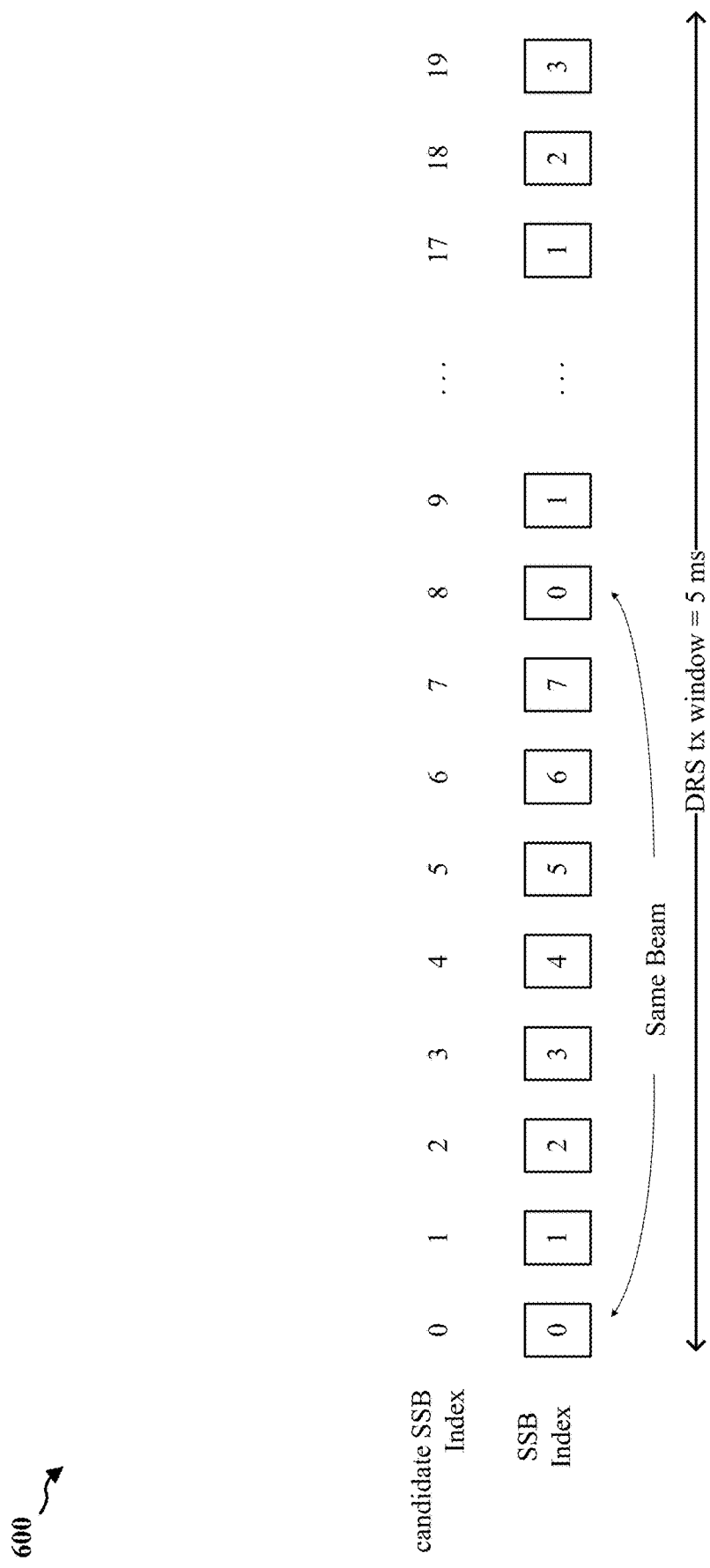
FIG. 6 is a diagram of example SSB pattern.

FIG. 6 is a diagram 600 of an example SSB pattern with an SCS of 30 kHz, and a number of candidate SSBs within 5 ms of the DRS tx window ($N_{SSB}^{QCL}$) of 8 ms. Diagram 600 illustrates the example SSB pattern that may provide multiple wraparound tx opportunities in a single DRS tx window. That is, for each SSB associated with the corresponding beam or QCL, if the base station fails to clear the LBT to transmit an SSB, the base station may have another opportunity to transmit the SSB within the same DRS tx window.

In one aspect, the base station may indicate $N_{SSB}^{QCL}$ to the UE, and the $N_{SSB}^{QCL}$ range may be {1, 2, 4, 8}. The $N_{SSB}^{QCL}$ may be indicated by a master information block (MIB) for initial random access or a dedicated radio resource control (RRC) signaling for radio resource management (RRM). The UE may be aware of the QCL relationship between SSBs using $N_{SSB}^{QCL}$. In one aspect, the number of transmitted SSBs within a DRS transmission window may be no larger than $N_{SSB}^{QCL}$, e.g., from the UE's perspective.

In one aspect, the SSB index may be expressed as a modulo function that is based on $N_{SSB}^{QCL}$ and a PBCH DMRS sequence index or the candidate SSB index. For example, the SSB index may be expressed as modulo(PBCH DMRS seq idx, $N_{SSB}^{QCL}$) or modulo(Candidate SSB idx, $N_{SSB}^{QCL}$). In one aspect, for a given cell, UE may assume that the SSBs in the same candidate position within the DRS transmission window are QCLed across the DRS tx window.

In some aspects, the unlicensed band in which the base station transmits the SSBs, and in which the UE monitors for the SSBs, may be configured within the range of 52.6 GHz to 71 GHz. The unlicensed band system operation in this frequency range may be designed to have the SSB SCS of 120, 240, 480, and/or 960 kHz. In one aspect, with the 120 kHz SCS, the 64 SSB positions may occupy the entire 5 ms DRS tx window. That is, the 5 ms DRS tx window may not have additional candidate SSB positions available to provide multiple wraparound tx opportunities in a single DRS tx window. In another aspect, with the 240 kHz SCS, the 64 SSB positions may occupy 2.25 ms of the DRS tx window. That is, the 5 ms DRS tx window may have additional symbols available for additional candidate SSB positions beyond the 64 SSB positions. The additional candidate SSB positions may allow the base station to access the medium at a later point within a DRS transmission window and to transmit an SSB within the single DRS transmission window.

In some aspects, an extended DRS tx window may provide improved DRS tx window and beam or QCL relation designs to accommodate additional candidate SSB positions for higher SCS, i.e., 120, 240, 480, or 960 kHz.

Figure 7:
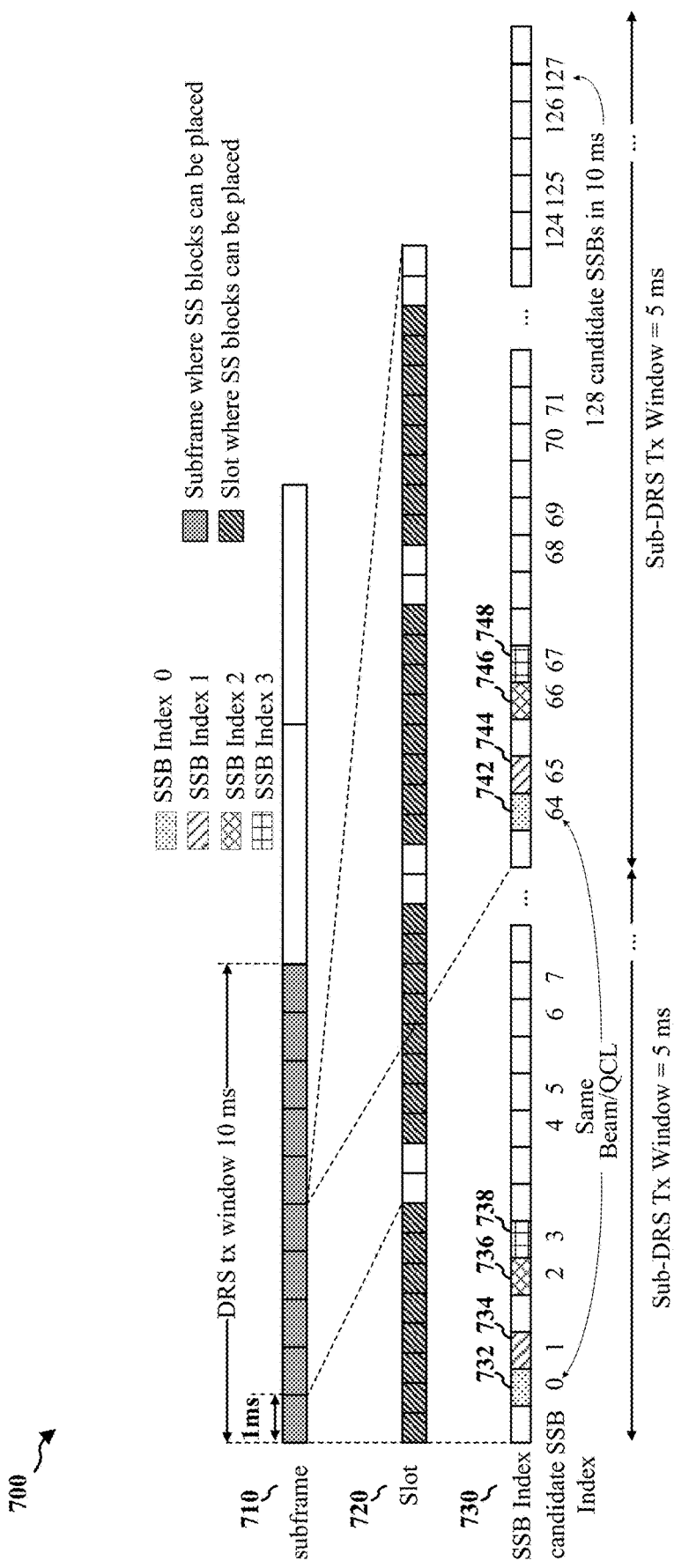
FIG. 7 is a diagram of example SSB pattern.

FIG. 7 is diagram 700 of an example SSB pattern in which an extended DRS window includes multiple sub-DRS transmission windows. Diagram 700 may include a subframe diagram 710, a slot diagram 720, and an SSB diagram 730. In some aspects, the DRS tx window may be extended. The extended DRS tx window may include the N number of sub-DRS tx windows. In some aspects, the sub-DRS tx window may correspond to the SSB pattern length. The sub-DRS tx window may be based on a length of an SSB pattern. In other aspects, the sub-DRS tx window may have a length that is different than the length of the SSB pattern.

In one aspect, the length of the extended DRS tx window (D) may be determined based on the following formula: D=L×N, where N refers to the number of the sub-DRS tx windows within the extended DRS tx window, and L refers to the length of the sub-DRS tx window. In one example, for SCS=120/240/480/960 kHz, the L may be 5 ms, the N may be 2, and the D may be 10 ms. In another example, for SCS=240 kHz, the L may be 3 ms, the N may be 2, and the D may be 6 ms.

In one aspect, the base station may configure one or more of the number of candidate SSBs within the SSB pattern ($N_{SSB}^{QCL}$), the $N_{SSB}^{QCL}$, the length of the sub-DRS tx window, and/or the number of the sub-DRS tx windows. The base station may signal the parameters for receiving UEs to use in receiving the SSBs transmitted by the base station. In other aspects, one or more of the number of candidate SSBs within the SSB pattern ($N_{SSB}^{QCL}$), the $N_{SSB}^{QCL}$, the length of the sub-DRS tx window, and/or the number of the sub-DRS tx windows may be defined. That is, the base station may signal one or more of the above parameters to the UE, or one or more of the above parameters may be predefined and known by the base station and/or the UE.

In some aspects, the DRS tx window of length D may include 64×N candidate SSBs, and the SSB beams/QCL pattern may be repeated for every sub-DRS tx window. That is, the base station may have candidate opportunities to transmit 64 candidate SSBs each of the N sub-DRS tx windows in the extended DRS tx window. For example, the base station may transmit 64 candidate SSBs each of the N sub-DRS tx window, and the base station may repeat the sub-DRS tx window N times, e.g., if the base station is able to access the channel based on an LBT procedure. If the base station does not pass LBT in order to transmit an SSB for an SSB index within a first sub-DRS tx window, the base station may transmit the SSB within a later sub-DRS tx window of the extended DRS tx window. In one aspect, the SSB beam index may be derived using a modulo function based on the candidate SSB index and the number of candidate SSBs within the sub-DRS tx window. For example, the SSB beam index may be derived according to the modulo(candidate SSB idx, $N_{SSB}^{QCL}$).

In some aspects, candidate SSB indexes may be provided for 64 beams, e.g., for SSB transmission in FR2, and the candidate SSB index may be configured with 6 bits data, i.e., 3 bits in PBCH L1 and 3 bits in the PBCH DMRS. If the UE knows the parameter N and at least one of $N_{SSB}^{QCL}$ or L, the UE may derive a candidate SSB index for reception of SSB from a base station. In one aspect, the base station may indicate the relevant parameters to the UE in additional bits of information, and the additional bits may be budgeted to transmit the parameters; e.g., in the MIB, the PBCH L1 multiplexing, and/or the DMRS sequence. In another aspect, to reduce the need for signaling by the base station, some of the parameters may be defined. That is, one or more of the parameters may be preconfigured or reuse, or be based on, a defined parameter. For example, L may be configured as the SSB pattern length, e.g., 5 ms for 120 kHz, 3 ms for 240 kHz, etc. The base station may signal the parameter N, the number of sub-DRS tx window, to the UE. For example, the parameter N may be two (2).

In some aspects, the sub-DRS tx window may be configured based on the half-frame DRS tx window, and the sub-DRS tx window may be repeated N times to form the extended DRS tx window. The multiple sub-DRS tx window configuration described in connection with FIG. 7 may avoid ambiguity for a half frame using a half-frame bit.

Diagram 700 of FIG. 7 illustrates an example SSB diagram 730 with a 120 kHz SSC, $N_{SSB}^{QCL}$ of 64, N of 2, L of 5 ms, and D of 10 ms. The SSB diagram 730 may include, in the first sub-DRS tx window, a first SSB with SSB index of 0 transmitted at a first candidate SSB 732 with candidate SSB index of 0, a second SSB with SSB index of 1 transmitted at a second candidate SSB 734 with candidate SSB index of 1, a third SSB with SSB index of 2 transmitted at a third candidate SSB 736 with candidate SSB index of 2, and a fourth SSB with SSB index of 3 transmitted at a fourth candidate SSB 738 with candidate SSB index of 3. In the second sub-DRS tx window, the SSB diagram 730 may include the first SSB with SSB index of 0 transmitted at a $65^{th}$ candidate SSB 742 with candidate SSB index of 64, the second SSB with SSB index of 1 transmitted at a 66th candidate SSB 744 with candidate SSB index of 65, the third SSB with SSB index of 2 transmitted at a $67^{th}$ candidate SSB 746 with candidate SSB index of 66, and the fourth SSB with SSB index of 3 transmitted at a $68^{th}$ candidate SSB 748 with candidate SSB index of 67. That is, the DRS tx window may include two sub-DRS tx windows, and the four SSBs allocated at the first four candidate SSBs in the first sub-DRS tx window may be repeated in the second sub-DRS tx window. The SSBs having the same SSB index may have the same beam or QCL. Accordingly, if the base station fails to transmit the first SSB in the first candidate SSB 732, the base station may retransmit the first SSB in the $65^{th}$ candidate SSB 742 in the second sub-DRS tx window and not wait 20 ms to retransmit the first SSB.

In some aspects, the extended DRS tx window of diagram 700 may provide multiple repetitions or opportunities for transmitting the SSB per QCL/beam. The extended DRS tx window may be provided by repeating sub-DRS tx window configured based on the half-frame DRS tx window, the implementation may be relatively simple, and the signaling overhead for the configuration may be minimized or reduced.

Figure 8:
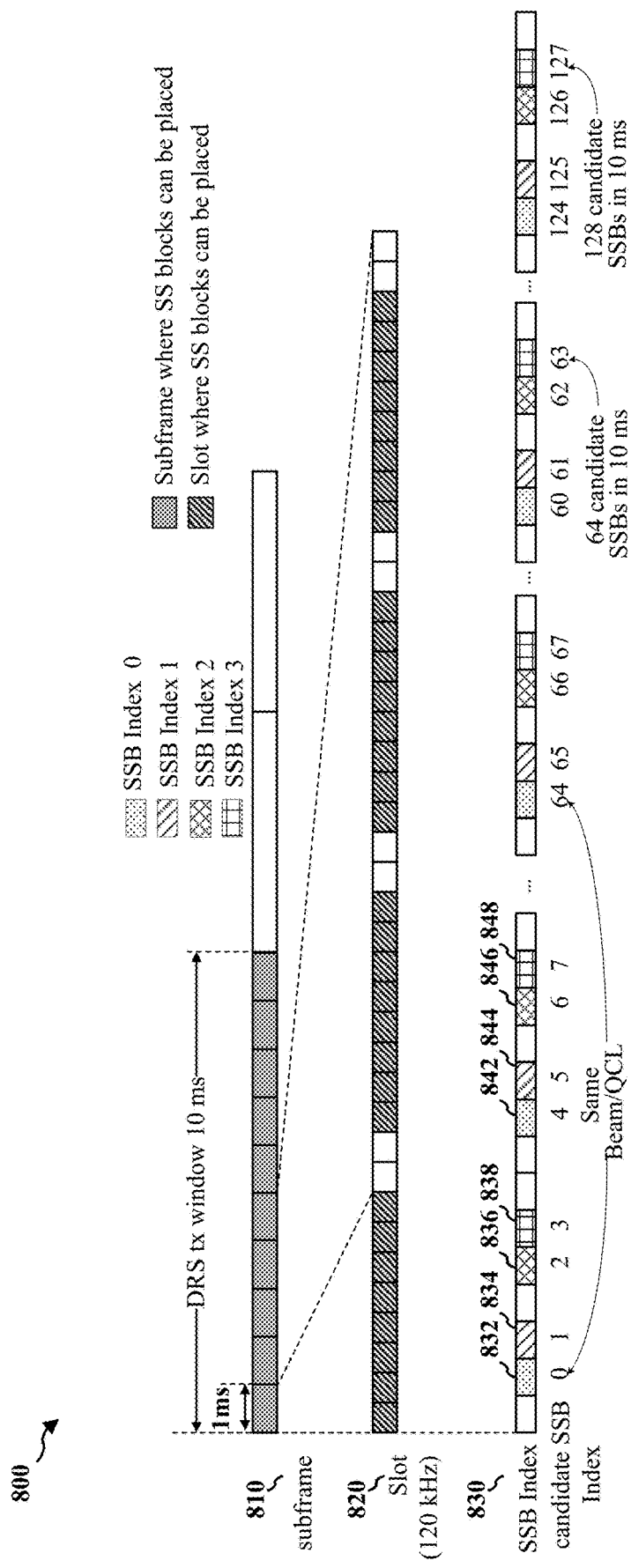
FIG. 8 is a diagram of example SSB pattern.

FIG. 8 is a diagram 800 of an example SSB pattern. Diagram 800 may include a subframe diagram 810, a slot diagram 820, and an SSB diagram 830. In some aspects, the DRS tx window may be extended. For example, diagram 800 illustrates that the DRS tx window is extended to have a length D of 10 ms for SCS of 120 kHz.

The extended DRS tx window may include 64×N candidates for transmission of SSBs, with repetition of the set of SSB beam/QCL pattern within the DRS tx window. In some aspects, the base station may transmit 64×N candidate SSBs within the DRS tx window of length D, and the set of SSB beams/QCLs may be repeatedly transmitted within the DRS tx window, e.g., if the base station is able to access the channel after performing an LBT procedure. That is, the base station may transmit up to 64×N SSBs based on the candidate SSBs in the DRS tx window, and the base station may repeat the transmission of the set of SSB beams/QCLs on the 64×N candidate SSBs within the DRS tx window. If the base station does not pass LBT in order to transmit an SSB in a first SSB candidate for an SSB index within the DRS tx window, the base station may transmit the SSB at an SSB candidate that is a repetition for the corresponding SSB index. In some aspects, the parameter N may be signaled by the base station. In other aspects, the parameter N may be defined and may be known by the UE without signaling from the base station. That is, the base station may indicate the parameter N to the UE, or the parameter N may be predefined and known by the base station and the UE. For example, the parameter N may be two (2) for SCS=120 kHz. In one aspect, the SSB beam index may be derived using a modulo function based on the candidate SSB index and the number of SSBs with different beam or QCL ($N_{SSB}^{QCL}$). That is, the parameter $N_{SSB}^{QCL}$ may refer to the number of SSBs within the set of SSBs to be transmitted to the UE. For example, the SSB beam index may be derived according to modulo (candidate SSB idx, $N_{SSB}^{QCL}$).

In some aspects, candidate SSB indexes may be provided for 64 beams, e.g., for transmission in FR2, and the candidate SSB index may be configured with 6 bits data. To accommodate the 64×N candidate SSBs, in the extended DRS tx window, the candidate SSBs may be indexed with 6+log$_2$ N bits of data. In one aspect, the SCS may be 120 kHz with 64 beams configured to span for the half-frame and N may be 2, and the candidate SSB index 0 . . . 127 may be derived from a combination of a "half-frame bit" and the 6-bits already used for the SSB index. For example, for the first 64 candidate SSBs, the candidate SSB index may be configured as the 6-bit SSB index based on the half-frame bit being 0. For example, for the $65^{th}$ to $128^{th}$ candidate SSBs, the candidate SSB index may be configured as 64+the 6-bit candidate SSB index based on the half-frame bit being 1.

In another aspect, the candidate SSBs may span less than the half-frame, e.g., higher SCS, or the parameter N may be greater than 2 for SCS 120 kHz, from the base station may indicate information about the parameters in one or more of the MIB, the PBCH L1 multiplexing, or the DMRS sequence to indicate the $\log_2$ N additional bits of data.

Diagram 800 of FIG. 8 illustrates an example SSB diagram 830 with a 120 kHz SSC, $N_{SSB}^{QCL}$ of 4, N of 2, and D of 10 ms. The SSB diagram 830 may include a first SSB with SSB index of 0 transmitted at a first candidate SSB 832 with candidate SSB index of 0, a second SSB with SSB index of 1 transmitted at a second candidate SSB 834 with candidate SSB index of 1, a third SSB with SSB index of 2 transmitted at a third candidate SSB 836 with candidate SSB index of 2, and a fourth SSB with SSB index of 3 transmitted at a fourth candidate SSB 838 with candidate SSB index of 3. The SSB diagram 830 may also include the first SSB with SSB index of 0 transmitted at a fifth candidate SSB 842 with candidate SSB index of 4, the second SSB with SSB index of 1 transmitted at a sixth candidate SSB 844 with candidate SSB index of 5, the third SSB with SSB index of 2 transmitted at a seventh candidate SSB 846 with candidate SSB index of 6, and a fourth SSB with SSB index of 3 transmitted at an eight candidate SSB 848 with candidate SSB index of 7. That is, the four SSBs are repeatedly transmitted within the DRS tx window. Accordingly, if the base station fails to transmit the first SSB in the first candidate SSB 832, the base station may retransmit the first SSB in the fifth candidate SSB 842 and not wait 20 ms to retransmit the first SSB.

In some aspects, the extended DRS tx window of diagram 800 may provide a relatively faster beam sweep time than the extended DRS tx window illustrated in FIG. 7, and may provide multiple repetitions or opportunities for transmitting each SSB per QCL/beam. To accommodate the extended DRS tx window of diagram 800, the base station may budget extra bits to indicate the candidate SSB index to the UE. In one aspect, the repeated opportunities may block data transmission of the other channels.

Figure 9:
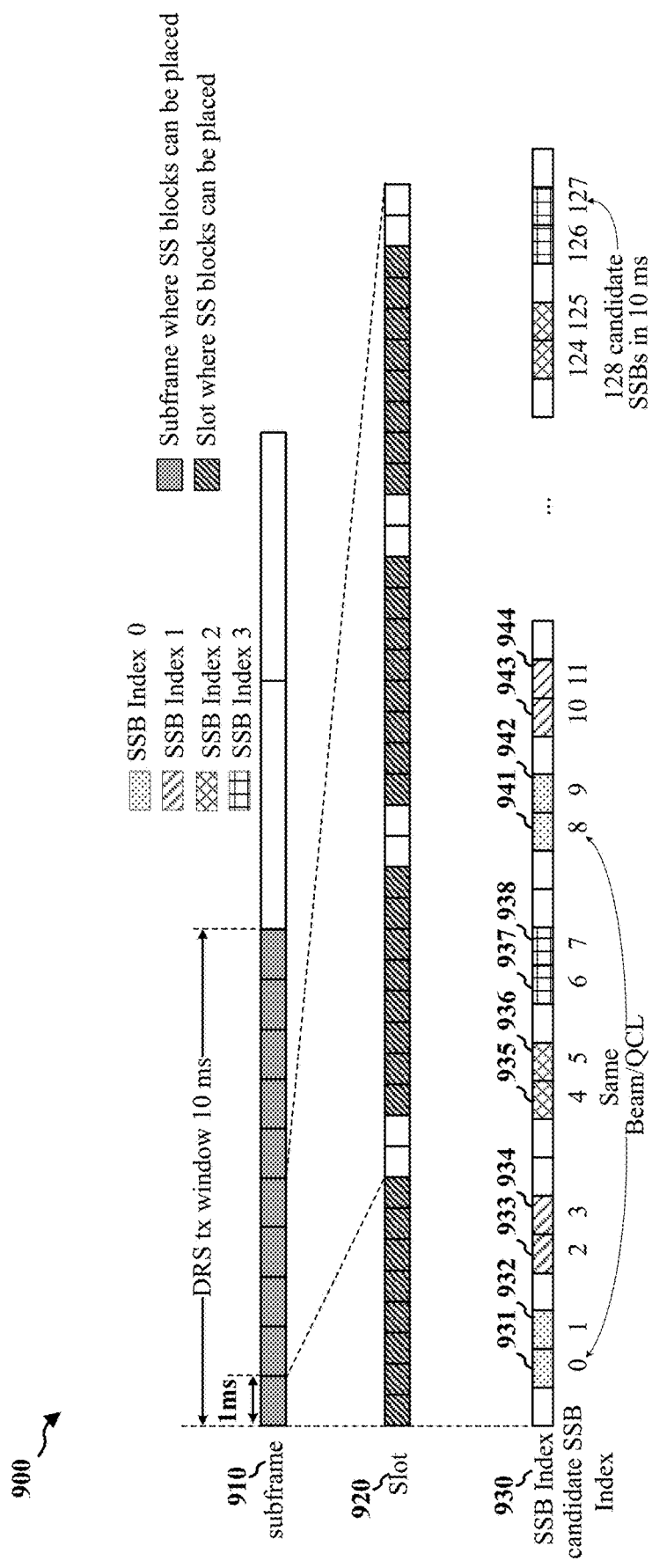
FIG. 9 is a diagram of example SSB pattern.

FIG. 9 is a diagram 900 of an example SSB pattern. Diagram 900 may include a subframe diagram 910, a slot diagram 920, and an SSB diagram 930. In some aspects, the DRS tx window may be extended. For example, diagram 900 illustrates that the DRS tx window is extended to have a length D of 10 ms for SCS of 120 kHz.

In some aspects, the base station may have candidate opportunities to transmit 64×N candidate SSBs within the DRS tx window of length D. The bae station may transmit the SSBs based on a pattern including a set of SSB beams in which each SSB beam candidate is repeated N times, and the set of SSB beams repeats within the DRS tx window. That is, the pattern may provide for repeated transmissions of an SSB for a particular SSB beam/QCL before the pattern provides a candidate for transmission of an SSB for a different SSB beam/QCL. Thus, if the base station passes LBT, the base station may repeatedly transmit the set of SSB beams within the DRS tx window, and the set of SSB beams may include each SSB beam repeated N times.

In some aspects, the base station may signal the parameter N, or N may be defined and known by the base station and UE. That is, the base station may indicate the parameter N to the UE, or the parameter N may be predefined for the base station and the UE. For example, the parameter N may be two (2) for SCS=120 kHz. In one aspect, since each SSB beam of the set of SSB is repeated N times, the SSB beams with candidate SSB indices $N^*N_{SSB}^{QCL}$ apart are QCL'ed or have the same beam.

Accordingly, the SSB beam index may be derived using a modulo function based on a floor of a candidate SSB index divided by N, and a number of SSBs within the pattern of SSB with different beam or QCL ($N_{SSB}^{CL}$). That is, the parameter $N_{SSB}^{CL}$ may refer to the number of SSBs within the set of SSBs to be transmitted to the UE. For example, the SSB beam index may be derived according to modulo $$\left(\text{floor}\left(\frac{\text{candidate SSB idx}}{N}\right), N_{SSB}^{QCL}\right).$$

In some aspects, SSB candidate indexes may be provided for 64 beams, e.g., for transmission in FR2, and the candidate SSB index may be configured with 6 bits of data. To accommodate the 64×N candidate SSBs, in the extended DRS tx window, the candidate SSBs may be indexed with 6+$\log_2$ N bits of data. If the UE knows the parameter $N_{SSB}^{QCL}$ and the parameter N, it may derive the SSB index from the candidate SSB index. In one aspect, the base station may signal information in one or more of the MIB, the PBCH L1 multiplexing, or the DMRS sequence to indicate the $\log_2$ N additional bits of data. In another aspect, to reduce the signaling overhead, some of the parameters may be specified or preconfigured. For example, the parameter N may be specified as 2.

Diagram 900 of FIG. 9 illustrates an example SSB diagram 930 with a 120 kHz SSC, $N_{SSB}^{QCL}$ of 4, N of 2, and D of 10 ms. The SSB diagram 930 may include an SSB set including a first SSB with SSB index of 0 repeatedly transmitted at a first candidate SSB 931 with candidate SSB index of 0 and a second candidate SSB 932 with candidate SSB index of 1, a second SSB with SSB index of 1 repeatedly transmitted at a third candidate SSB 933 with candidate SSB index of 2 and a fourth candidate 934 with candidate SSB index of 3, a third SSB with SSB index of 2 repeatedly transmitted at a fifth candidate SSB 935 with candidate SSB index of 4 and a sixth candidate SSB 936 with candidate SSB index of 5, and a fourth SSB with SSB index of 3 repeatedly transmitted at a seventh candidate SSB 937 with candidate SSB index of 6 and an eighth candidate SSB 938 with candidate SSB index of 7. The SSB diagram 930 may repeat the transmission of the SSB set within the extended DRS tx window. Accordingly, the SSB diagram 930 may include the first SSB with SSB index of 0 repeatedly transmitted at a ninth candidate SSB 941 with candidate SSB index of 8 and a tenth candidate SSB 942 with candidate SSB index of 9, and the second SSB with SSB index of 1 repeatedly transmitted at an eleventh candidate SSB 943 with candidate SSB index of 10 and a twelfth candidate 944 with candidate SSB index of 11. That is, the base station may repeat the transmission of the set of SSBs within the DRS tx window, where the set of SSBs includes each SSBs sequentially repeated N times.

In some aspects, the extended DRS tx window of diagram 900 may provide a relatively faster beam sweep time than the extended DRS tx window illustrated in FIG. 7 and provide multiple repetitions or opportunities for transmitting the SSB per QCL/beam. To accommodate the extended DRS tx window of diagram 800, the base station may budget extra bits to indicate the candidate SSB index to the UE. In one aspect, the repeated opportunities may block data transmission of the other channels.

Figure 10:
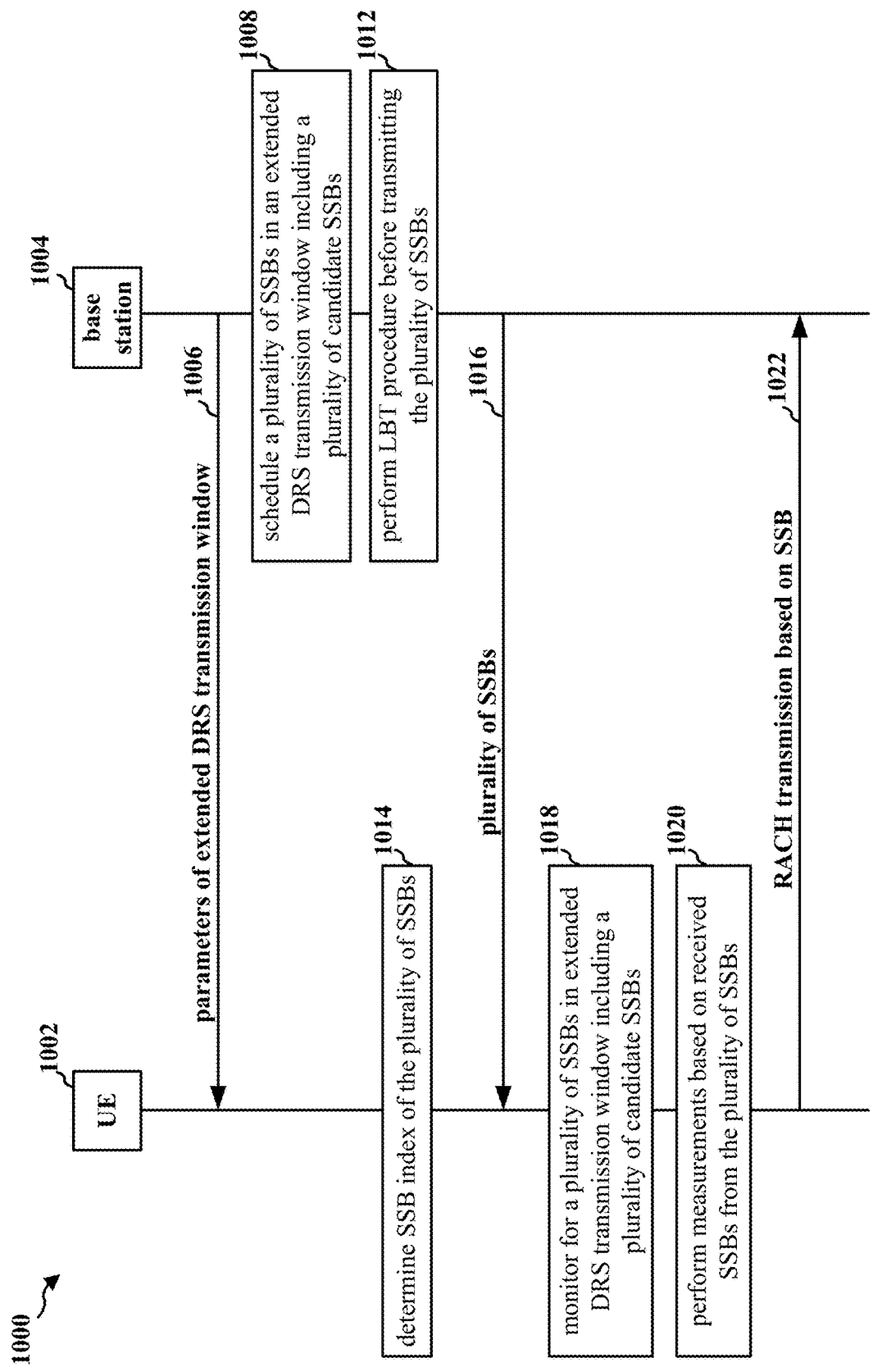
FIG. 10 illustrates a communication diagram of wireless communication.

FIG. 10 illustrates a communication diagram 1000 of wireless communication. The communication diagram 1000 may include a UE 1002 and a base station 1004. The base station 1004 may schedule a plurality of SSBs in an extended DRS transmission window comprising a plurality of candidate SSBs including at least two candidate SSBs with a same SSB beam index; and transmit the plurality of SSBs based on the scheduling of the plurality of SSBs in the extended DRS transmission window. The UE 1002 may monitor for a plurality of SSBs in an extended DRS transmission window including a plurality of candidate SSBs including at least two candidate SSBs with the same SSB beam index and perform measurements based on SSBs of the plurality of SSBs received from a base station 1004. The UE 1002 and the base station 1004 may have in improved opportunities for SSB transmission.

At 1006, the base station 1004 may transmit, to the UE 1002, an indication of one or more parameters of extended DRS transmission window, such as described above in connection with any of FIGS. 7-9. The UE 1002 may receive, from the base station 1004, an indication of one or more parameters of extended DRS transmission window. Here, the one or more parameters of the extended DRS transmission window may include a signal indicating one or more scheduling parameters of the plurality of SSBs. The UE 1002 may receive a signal indicating one or more scheduling parameters of the plurality of SSBs. The one or more parameters transmitted at 1006 may include one or more of the number of candidate SSBs within each of the sub-DRS transmission windows, a sub-DRS window length, or a number of sub-DRX transmission windows within the extended DRS transmission window. The one or more parameters transmitted at 1006 may also include one or more of the integer N or the number of SSBs within the pattern of candidate SSBs.

At 1008, the base station 1004 may schedule a plurality of SSBs in an extended DRS transmission window including a plurality of candidate SSBs including at least two candidate SSBs with a same SSB beam index. For example, the extended DRS tx window may include 64×N candidates for transmission of SSBs, with repetition of the set of SSB beam/QCL pattern within the DRS tx window. In some aspects, the base station 1004 may transmit 64×N candidate SSBs within the DRS tx window of length D, and the set of SSB beams/QCLs may be repeatedly transmitted within the DRS tx window.

At 1012, the base station 1004 may perform an LBT procedure before transmitting the scheduled plurality of SSBs. That is, the base station 1004 may listen for transmissions from other wireless devices and determine whether the downlink channel is available for transmitting each SSB. The base station 1004 may transmit the SSB based on the determination that the downlink channel is available for transmission, and if the base station 1004 determines that there is a collision, the base station 1004 may not transmit the colliding SSB at a candidate position.

At 1014, the UE 1002 may determine SSB index of the plurality of SSBs. That is, the UE 1002 may determine the SSB index of the plurality of SSBs based on the indication of one or more parameters of extended DRS transmission window received from the base station 1004. For example, the UE may determine the SSB index using the information received from the base station at 1102 or based on defined parameters.

At 1016, the base station 1004 may transmit the plurality of SSBs based on the scheduling of the plurality of SSBs in the extended DRS transmission window. For example, the base station 1004 may transmit up to 64×N SSBs based on the candidate SSBs in the DRS tx window, and the base station 1004 may repeat the transmission of the set of SSB beams/QCLs on the 64×N candidate SSBs within the DRS tx window. If the base station 1004 does not pass LBT in order to transmit an SSB in a first SSB candidate for an SSB index within the DRS tx window, the base station 1004 may transmit the SSB at an SSB candidate that is a repetition for the corresponding SSB index.

At 1018, the UE 1002 may monitor for the plurality of SSBs in an extended DRS transmission window including a plurality of candidate SSBs including at least two candidate SSBs with a same SSB beam index. That is, the UE 1002 may monitor for a plurality of SSBs in an extended DRS transmission window comprising a plurality of candidate SSBs including at least two candidate SSBs with a same SSB beam index; and perform measurements based on SSBs of the plurality of SSBs received from the base station 1004.

In one aspect, the extended DRS transmission window may include multiple sub-DRS transmission windows, each of the multiple sub-DRS transmission windows including at least one transmission of each of the plurality of SSBs, e.g., as described in connection with FIG. 7. The base station 1004 may schedule to transmit a pattern of SSBs that is repeated in each sub-DRS transmission window of the extended DRS transmission window. The UE 1002 may determine the SSB index of each candidate SSB of the plurality of candidate SSBs based on a modulo function that is based on a candidate SSB index and a number of candidate SSBs within each sub-DRS transmission window $N_{SSB}^{QCL}$. For example, the SSB beam index may be derived according to the modulo(candidate SSB idx, $N_{SSB}^{QCL}$). The one or more parameters transmitted at 1006 may include one or more of the number of candidate SSBs within each of the sub-DRS transmission windows, a sub-DRS window length, or a number of sub-DRX transmission windows within the extended DRS transmission window.

In another aspect, the plurality of candidate SSBs may include N sets of candidate SSBs, N being an integer number greater than or equal to 2, and the base station 1004 may repeat transmission of a pattern of SSBs in the extended DRS transmission window, e.g., as described in connection with FIG. 8. The UE 1002 may determine the SSB index of each candidate SSB of the plurality of candidate SSBs using a modulo function based on a candidate SSB index and a number of SSBs within the pattern of SSBs ($N_{SSB}^{QCL}$). For example, the SSB beam index may be derived according to modulo(candidate SSB idx, $N_{SSB}^{QCL}$). The one or more parameters transmitted at 1006 may include one or more of the integer N or the number of SSBs within the pattern of candidate SSBs.

In another aspect, the plurality of SSBs may include a pattern of SSBs, and the base station 1004 may sequentially repeat transmission of each SSB of the pattern of SSBs N times within the pattern of SSBs, N being an integer number greater than or equal to 2, e.g., as described in connection with FIG. 9. For example, the base station 1004 may transmit a first SSB and a repetition of the first SSB prior to transmitting a second SSB within the extended DRS transmission window. The UE 1002 may determine the SSB index of each candidate SSB of the plurality of candidate SSBs using a modulo function that is based on a floor of a candidate SSB index divided by N, and a number of SSBs within the pattern of SSBs ($N_{SSB}^{QCL}$). For example, the SSB beam index may be derived according to modulo $$\left(\text{floor}\left(\frac{\text{candidate } SSB \text{ idx}}{N}\right), N_{SSB}^{QCL}\right).$$

The one or more parameters transmitted at 1006 may include one or more of the integer N or the number of SSBs within the pattern of SSBs.

At 1020, the UE 1002 may perform measurements based on received SSBs from the plurality of SSBs. Based on the received SSB, the UE 1002 may select a beam for initiating a random access procedure, e.g., transmission of a RACH message, to the base station 1004. That is, the UE 1002 may perform the measurements of the received SSBs from the plurality of SSBs received from the base station 1004, and select the beam based on the measurements of the received SSBs from the plurality of SSBs. For example, the UE 1002 may select the beam associated with measurements greater than or equal to a threshold value or select the beam associated with the best measurement.

At 1022, the UE 1002 may transmit a RACH transmission to the base station 1004. In some aspects, the RACH transmission may include a Msg 1 of a four-step random access procedure or a Msg A of a two-step random access procedure. The UE 1002 may select a beam based on one or more SSBs received from the base station 1004. One or more of the parameters of the RACH transmission may be based on the SSB index corresponding to the selected beam. For example, the preamble, time, and/or frequency resource of the RACH transmission may be based on the selected SSB index. Thus, based on the RACH transmission, the base station 1004 may determine a beam to use for transmitting communication, such as a random access response (RAR) to the UE 1002.

Figure 11:
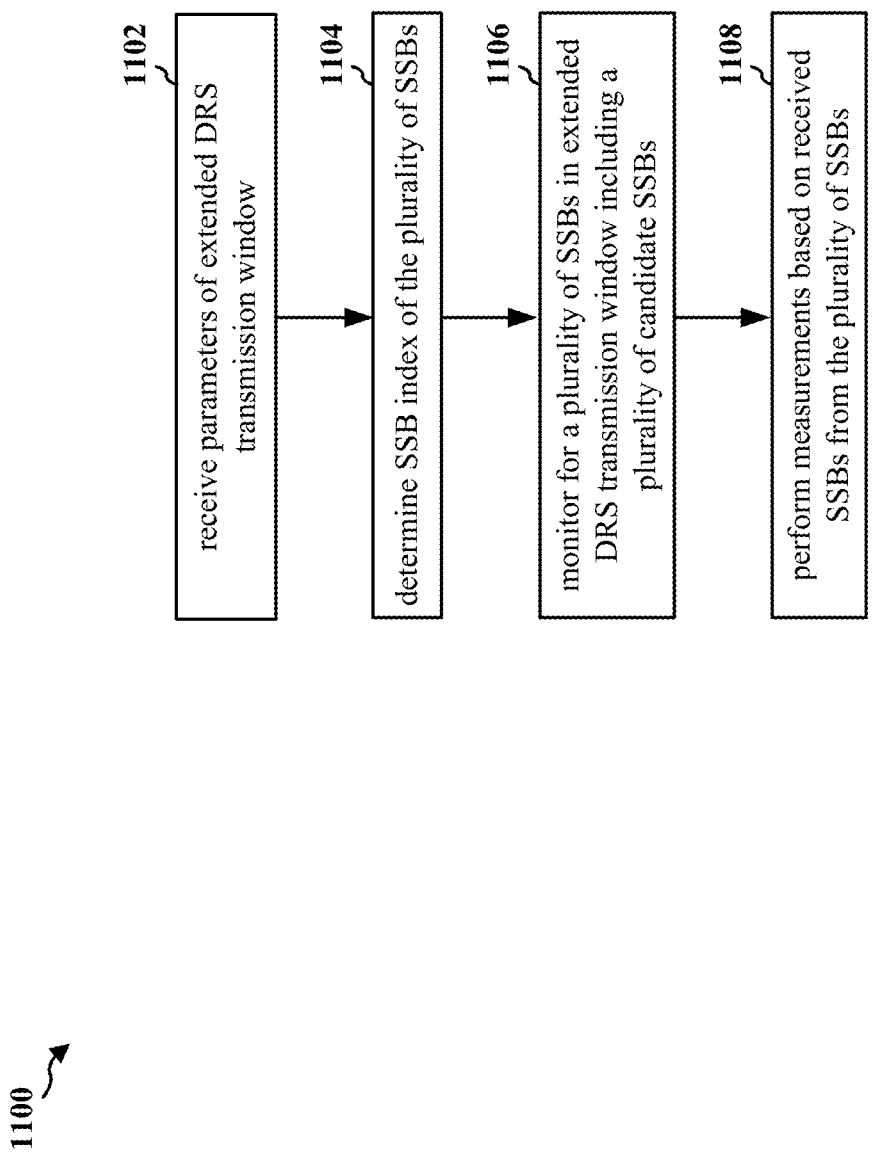
FIG. 11 is a flowchart of a method of wireless communication.

FIG. 11 is a flowchart 1100 of a method of wireless communication. The method may be performed by a UE (e.g., the UE 104, 350, 404, 1002; the apparatus 1502). The UE may monitor for a plurality of SSBs in an extended DRS transmission window including a plurality of candidate SSBs including at least two candidate SSBs with a same SSB beam index and perform measurements based on SSBs of the plurality of SSBs received from a base station. The UE may have in improved opportunities for SSB transmission.

At 1102, the UE may receive one or more parameters of extended DRS transmission window from a base station. The one or more parameters received at 1102 may correspond to the parameters 1006, as described in connection with FIG. 10. The parameters may include one or more of the number of candidate SSBs within each of the sub-DRS transmission windows, a sub-DRS window length, or a number of sub-DRX transmission windows within the extended DRS transmission window. Here, the one or more parameters of the extended DRS transmission window may include a signal indicating one or more scheduling parameters of the plurality of SSBs. The UE may receive a signal indicating one or more scheduling parameters of the plurality of SSBs. The one or more parameters transmitted may include one or more of the number of candidate SSBs within each of the sub-DRS transmission windows, a sub-DRS window length, or a number of sub-DRX transmission windows within the extended DRS transmission window. The one or more parameters transmitted may include one or more of the integer N or the number of SSBs within the pattern of candidate SSBs. For example, at 1006, the UE 1002 may receive, from the base station 1004, an indication of one or more parameters of extended DRS transmission window. Furthermore, 1102 may be performed, e.g., by the reception component 1546 of the apparatus 1502 in FIG. 15.

At 1104, the UE may determine SSB index of the plurality of SSBs. That is, the UE may determine the SSB index of the plurality of SSBs based on the indication of one or more parameters of extended DRS transmission window received from the base station. For example, the UE may determine the SSB index using the information received from the base station at 1102 or based on defined parameters. The determination may include any of the aspects described in connection with 1014 in FIG. 10, and/or the aspects described in connection with FIGS. 7-9. For example, at 1014, the UE 1002 may determine SSB index of the plurality of SSBs. Furthermore, 1104 may be performed, e.g., by the SSB index determination component 1544 of the apparatus 1502 in FIG. 15.

At 1106, the UE may monitor for a plurality of SSBs in an extended DRS transmission window including a plurality of candidate SSBs including at least two candidate SSBs with a same SSB beam index. That is, the UE may monitor for a plurality of SSBs in an extended DRS transmission window comprising a plurality of candidate SSBs including at least two candidate SSBs with a same SSB beam index; and perform measurements based on SSBs of the plurality of SSBs received from the base station. For example, at 1018, the UE 1002 may monitor for the plurality of SSBs in an extended DRS transmission window including a plurality of candidate SSBs including at least two candidate SSBs with a same SSB beam index. Furthermore, 1106 may be performed by the SSB component 1540.

In one aspect, the extended DRS transmission window may include multiple sub-DRS transmission windows, each of the multiple sub-DRS transmission windows including at least one transmission of each of the plurality of SSBs, e.g., as described in connection with FIG. 7. The base station may schedule to transmit a pattern of SSBs that is repeated in each sub-DRS transmission window of the extended DRS transmission window. The UE may determine the SSB index of each candidate SSB of the plurality of candidate SSBs based on a modulo function that is based on a candidate SSB index and a number of candidate SSBs within each sub-DRS transmission window $N_{SSB}^{QCL}$. In one aspect, the SSB beam index may be derived according to the modulo(candidate SSB idx, $N_{SSB}^{QCL}$).

In another aspect, the plurality of candidate SSBs may include N sets of candidate SSBs, N being an integer number greater than or equal to 2, and the base station may repeat transmission of a pattern of SSBs in the extended DRS transmission window, e.g., as described in connection with FIG. 8. The UE may determine the SSB index of each candidate SSB of the plurality of candidate SSBs using a modulo function based on a candidate SSB index and a number of SSBs within the pattern of SSBs ($N_{SSB}^{QCL}$). For example, the SSB beam index may be derived according to modulo(candidate SSB idx, $N_{SSB}^{QCL}$).

In another aspect, the plurality of SSBs may include a pattern of SSBs, and the base station may sequentially repeat transmission of each SSB of the pattern of SSBs N times within the pattern of SSBs, N being an integer number greater than or equal to 2, e.g., as described in connection with FIG. 9. For example, the base station may transmit a first SSB and a repetition of the first SSB prior to transmitting a second SSB within the extended DRS transmission window. The UE may determine the SSB index of each candidate SSB of the plurality of candidate SSBs using a modulo function that is based on a floor of a candidate SSB index divided by N, and a number of SSBs within the pattern of SSBs ($N_{SSB}^{QCL}$). For example, the SSB beam index may be derived according to modulo $$\left(\text{floor}\left(\frac{\text{candidate } SSB \text{ idx}}{N}\right), N_{SSB}^{QCL}\right).$$

At 1108, the UE may perform measurements based on received SSBs from the plurality of SSBs. The measurements may include any of the aspects described in connection with 1020 in FIG. 10. The UE may perform the measurement in order to select a beam for communication with the base station, such as to perform RACH with the base station. That is, the UE 1002 may perform the measurements of the received SSBs from the plurality of SSBs received from the base station 1004, and select the beam based on the measurements of the received SSBs from the plurality of SSBs. For example, the UE 1002 may select the beam associated with measurements greater than or equal to a threshold value or select the beam associated with the best measurement. For example, at 1020, the UE 1002 may perform measurements based on received SSBs from the plurality of SSBs. Furthermore, 1108 may be performed by an SSB measurement component 1542.

Figure 12:
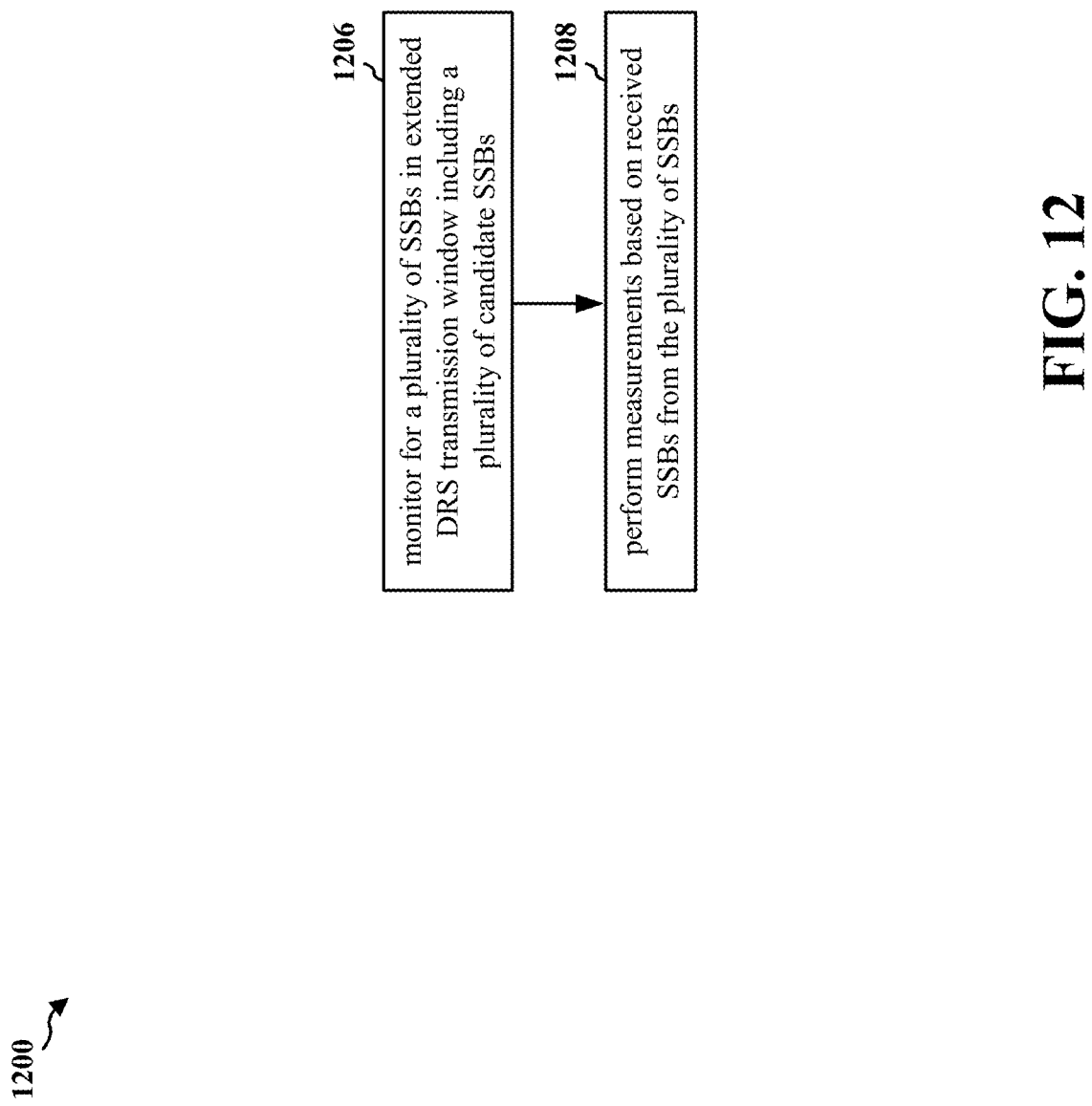
FIG. 12 is a flowchart of a method of wireless communication.

FIG. 12 is a flowchart 1200 of a method of wireless communication. The method may be performed by a UE (e.g., the UE 104, 350, 404, 1002; the apparatus 1502). The UE may monitor for a plurality of SSBs in an extended DRS transmission window including a plurality of candidate SSBs including at least two candidate SSBs with a same SSB beam index and perform measurements based on SSBs of the plurality of SSBs received from a base station. The UE may have in improved opportunities for SSB transmission.

At 1206, the UE may monitor for a plurality of SSBs in an extended DRS transmission window including a plurality of candidate SSBs including at least two candidate SSBs with a same SSB beam index. That is, the UE may monitor for a plurality of SSBs in an extended DRS transmission window comprising a plurality of candidate SSBs including at least two candidate SSBs with a same SSB beam index; and perform measurements based on SSBs of the plurality of SSBs received from the base station. For example, at 1018, the UE 1002 may monitor for the plurality of SSBs in an extended DRS transmission window including a plurality of candidate SSBs including at least two candidate SSBs with a same SSB beam index. Furthermore, 1206 may be performed by the SSB component 1540.

In one aspect, the extended DRS transmission window may include multiple sub-DRS transmission windows, each of the multiple sub-DRS transmission windows including at least one transmission of each of the plurality of SSBs, e.g., as described in connection with FIG. 7. The base station may schedule to transmit a pattern of SSBs that is repeated in each sub-DRS transmission window of the extended DRS transmission window. The UE may determine the SSB index of each candidate SSB of the plurality of candidate SSBs based on a modulo function that is based on a candidate SSB index and a number of candidate SSBs within each sub-DRS transmission window $N_{SSB}^{QCL}$. In one aspect, the SSB beam index may be derived according to the modulo(candidate SSB idx, $N_{SSB}^{QCL}$).

In another aspect, the plurality of candidate SSBs may include N sets of candidate SSBs, N being an integer number greater than or equal to 2, and the base station may repeat transmission of a pattern of SSBs in the extended DRS transmission window, e.g., as described in connection with FIG. 8. The UE may determine the SSB index of each candidate SSB of the plurality of candidate SSBs using a modulo function based on a candidate SSB index and a number of SSBs within the pattern of SSBs ($N_{SSB}^{QCL}$). For example, the SSB beam index may be derived according to modulo(candidate SSB idx, $N_{SSB}^{QCL}$).

In another aspect, the plurality of SSBs may include a pattern of SSBs, and the base station may sequentially repeat transmission of each SSB of the pattern of SSBs N times within the pattern of SSBs, N being an integer number greater than or equal to 2, e.g., as described in connection with FIG. 9. For example, the base station may transmit a first SSB and a repetition of the first SSB prior to transmitting a second SSB within the extended DRS transmission window. The UE may determine the SSB index of each candidate SSB of the plurality of candidate SSBs using a modulo function that is based on a floor of a candidate SSB index divided by N, and a number of SSBs within the pattern of SSBs ($N_{SSB}^{QCL}$). For example, the SSB beam index may be derived according to modulo $$\left(\text{floor}\left(\frac{\text{candidate SSB idx}}{N}\right), N_{SSB}^{QCL}\right).$$

At 1208, the UE may perform measurements based on received SSBs from the plurality of SSBs. The measurements may include any of the aspects described in connection with 1020 in FIG. 10. The UE may perform the measurement in order to select a beam for communication with the base station, such as to perform RACH with the base station. That is, the UE 1002 may perform the measurements of the received SSBs from the plurality of SSBs received from the base station 1004, and select the beam based on the measurements of the received SSBs from the plurality of SSBs. For example, the UE 1002 may select the beam associated with measurements greater than or equal to a threshold value or select the beam associated with the best measurement. For example, at 1020, the UE 1002 may perform measurements based on received SSBs from the plurality of SSBs. Furthermore, 1208 may be performed by an SSB measurement component 1542.

Figure 13:
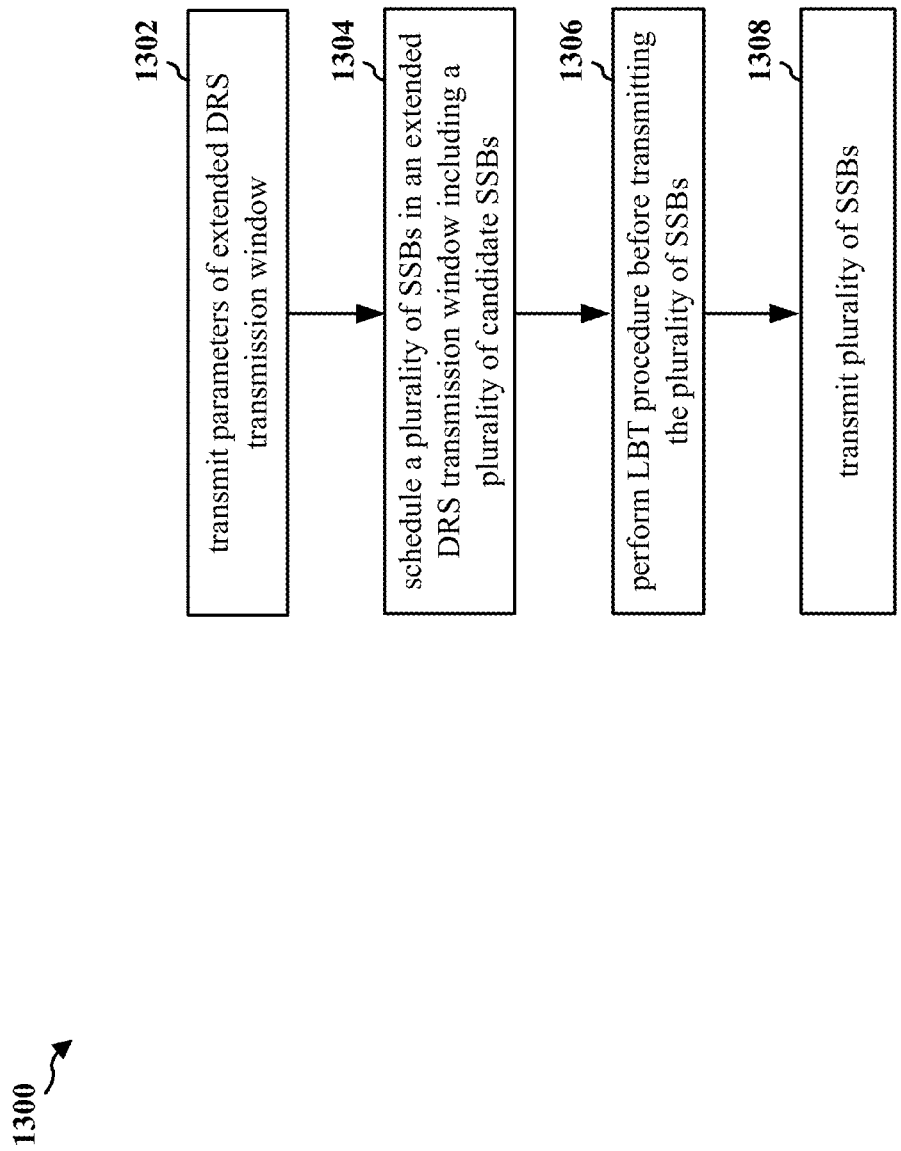
FIG. 13 is a flowchart of a method of wireless communication.

FIG. 13 is a flowchart 1300 of a method of wireless communication. The method may be performed by a base station (e.g., the base station 102/180, 310, 402, 1004; the apparatus 1602). The base station may schedule a plurality of SSBs in an extended DRS transmission window comprising a plurality of candidate SSBs including at least two candidate SSBs with a same SSB beam index; and transmit the plurality of SSBs based on the scheduling of the plurality of SSBs in the extended DRS transmission window. The base station may have an improved SSB transmission, e.g., may provide improved SSB candidates for transmission in a shared spectrum.

At 1302, the base station may transmit one or more parameters of extended DRS transmission window to the UE. Here, the one or more parameters of the extended DRS transmission window may include a signal indicating one or more scheduling parameters of the plurality of SSBs. The one or more parameters transmitted may include one or more of the number of candidate SSBs within each of the sub-DRS transmission windows, a sub-DRS window length, or a number of sub-DRX transmission windows within the extended DRS transmission window. The one or more parameters transmitted at 1006 may include one or more of the integer N or the number of SSBs within the pattern of candidate SSBs. For example, at 1006, the base station 1004 may transmit, to the UE 1002, an indication of one or more parameters of extended DRS transmission window. Furthermore, 1302 may be performed, e.g., by an SSB parameter component 1642.

At 1304, the base station schedules a plurality of SSBs in an extended DRS transmission window including a plurality of candidate SSBs including at least two candidate SSBs with a same SSB beam index. FIG. 10 illustrates an example of a base station 1004 scheduling SSB transmission, at 1008. For example, the extended DRS tx window may include 64×N candidates for transmission of SSBs, with repetition of the set of SSB beam/QCL pattern within the DRS tx window. In some aspects, the base station 1004 may transmit 64×N candidate SSBs within the DRS tx window of length D, and the set of SSB beams/QCLs may be repeatedly transmitted within the DRS tx window. For example, at 1008, the base station 1004 may schedule a plurality of SSBs in an extended DRS transmission window including a plurality of candidate SSBs including at least two candidate SSBs with a same SSB beam index. Furthermore, 1304 may be performed, e.g., by the SSB component 1640.

In one aspect, the extended DRS transmission window may include multiple sub-DRS transmission windows, each of the multiple sub-DRS transmission windows including at least one transmission of each of the plurality of SSBs, e.g., as described in connection with FIG. 7. The base station may schedule to transmit a pattern of SSBs that is repeated in each sub-DRS transmission window of the extended DRS transmission window. The UE may determine the SSB index of each candidate SSB of the plurality of candidate SSBs based on a modulo function that is based on a candidate SSB index and a number of candidate SSBs within each sub-DRS transmission window $N_{SSB}^{QCL}$. For example, the SSB beam index may be derived according to the modulo(candidate SSB idx, $N_{SSB}^{QCL}$).

In another aspect, the plurality of candidate SSBs may include N sets of candidate SSBs, N being an integer number greater than or equal to 2, and the base station may repeat transmission of a pattern of SSBs in the extended DRS transmission window, e.g., as described in connection with FIG. 8. The UE may determine the SSB index of each candidate SSB of the plurality of candidate SSBs using a modulo function based on a candidate SSB index and a number of SSBs within the pattern of SSBs ($N_{SSB}^{QCL}$). For example, the SSB beam index may be derived according to modulo(candidate SSB idx, $N_{SSB}^{QCL}$).

In another aspect, the plurality of SSBs may include a pattern of SSBs, and the base station may sequentially repeat transmission of each SSB of the pattern of SSBs N times within the pattern of SSBs, N being an integer number greater than or equal to 2, e.g., as described in connection with FIG. 9. For example, the base station may transmit a first SSB and a repetition of the first SSB prior to transmitting a second SSB within the extended DRS transmission window. The UE may determine the SSB index of each candidate SSB of the plurality of candidate SSBs using a modulo function that is based on a floor of a candidate SSB index divided by N, and a number of SSBs within the pattern of SSBs ($N_{SSB}^{QCL}$). For example, the SSB beam index may be derived according to modulo $$\left( \text{floor}\left( \frac{\text{candidate SSB idx}}{N} \right), N_{SSB}^{QCL} \right).$$

At 1306, the base station may perform an LBT procedure before transmitting the scheduled plurality of SSBs. The base station may monitor for, or measure, transmissions from other wireless devices in order to determine whether a wireless medium is available for transmission of an SSB in a particular SSB candidate. That is, the base station may transmit the SSB based on the determination that the downlink channel is available for transmission, and if the base station determines that there is a collision, the base station may not transmit the colliding SSB at a candidate position. For example, the base station may perform the LBT in order to transmit the SSB in a shared spectrum or an unlicensed spectrum. For example, at 1012, the base station 1004 may perform an LBT procedure before transmitting the scheduled plurality of SSBs. Furthermore, 1306 may be performed, e.g., by the LBT component 1644.

At 1308, the base station may transmit the plurality of SSBs based on the scheduling of the plurality of SSBs in the extended DRS transmission window. The base station may transmit an SSB in each candidate of the extended DRS transmission window in some aspects. The transmission may be based on the base station successfully completing an LBT procedure. In some aspects, the base station may not be able to transmit the SSB in one or more of the SSB candidates, e.g., based on an unsuccessful LBT. For example, the base station 1004 may transmit up to 64×N SSBs based on the candidate SSBs in the DRS tx window, and the base station 1004 may repeat the transmission of the set of SSB beams/QCLs on the 64×N candidate SSBs within the DRS tx window. If the base station 1004 does not pass LBT in order to transmit an SSB in a first SSB candidate for an SSB index within the DRS tx window, the base station may transmit the SSB at an SSB candidate that is a repetition for the corresponding SSB index. For example, at 1016, the base station 1004 may transmit the plurality of SSBs based on the scheduling of the plurality of SSBs in the extended DRS transmission window. Furthermore, 1308 may be performed, e.g., by the extended DRS component 1646.

Figure 14:
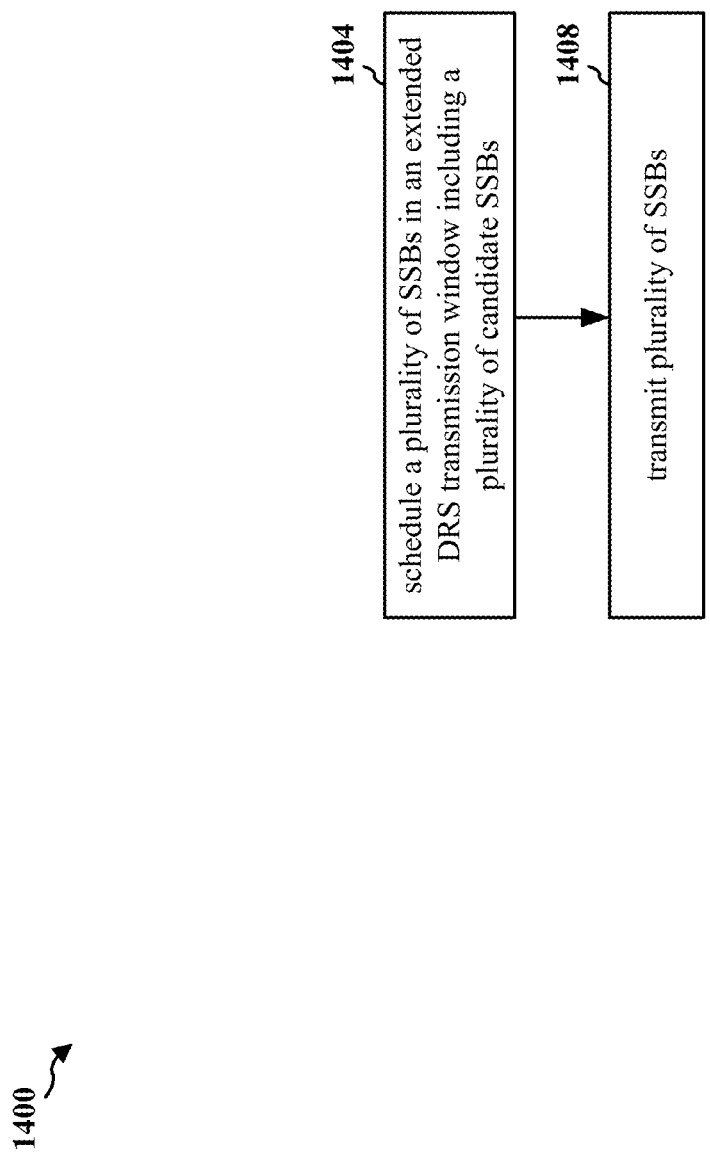
FIG. 14 is a flowchart of a method of wireless communication.

FIG. 14 is a flowchart 1400 of a method of wireless communication. The method may be performed by a base station (e.g., the base station 102/180, 310, 402, 1004; the apparatus 1602). The base station may schedule a plurality of SSBs in an extended DRS transmission window comprising a plurality of candidate SSBs including at least two candidate SSBs with a same SSB beam index; and transmit the plurality of SSBs based on the scheduling of the plurality of SSBs in the extended DRS transmission window. The base station may have an improved SSB transmission, e.g., may provide improved SSB candidates for transmission in a shared spectrum.

At 1404, the base station schedules a plurality of SSBs in an extended DRS transmission window including a plurality of candidate SSBs including at least two candidate SSBs with a same SSB beam index. FIG. 10 illustrates an example of a base station 1004 scheduling SSB transmission, at 1008. For example, the extended DRS tx window may include 64×N candidates for transmission of SSBs, with repetition of the set of SSB beam/QCL pattern within the DRS tx window. In some aspects, the base station 1004 may transmit 64×N candidate SSBs within the DRS tx window of length D, and the set of SSB beams/QCLs may be repeatedly transmitted within the DRS tx window. For example, at 1008, the base station 1004 may schedule a plurality of SSBs in an extended DRS transmission window including a plurality of candidate SSBs including at least two candidate SSBs with a same SSB beam index. Furthermore, 1404 may be performed, e.g., by the SSB component 1640.

In one aspect, the extended DRS transmission window may include multiple sub-DRS transmission windows, each of the multiple sub-DRS transmission windows including at least one transmission of each of the plurality of SSBs, e.g., as described in connection with FIG. 7. The base station may schedule to transmit a pattern of SSBs that is repeated in each sub-DRS transmission window of the extended DRS transmission window. The UE may determine the SSB index of each candidate SSB of the plurality of candidate SSBs based on a modulo function that is based on a candidate SSB index and a number of candidate SSBs within each sub-DRS transmission window $N_{SSB}^{QCL}$. For example, the SSB beam index may be derived according to the modulo(candidate SSB idx, $N_{SSB}^{QCL}$).

In another aspect, the plurality of candidate SSBs may include N sets of candidate SSBs, N being an integer number greater than or equal to 2, and the base station may repeat transmission of a pattern of SSBs in the extended DRS transmission window, e.g., as described in connection with FIG. 8. The UE may determine the SSB index of each candidate SSB of the plurality of candidate SSBs using a modulo function based on a candidate SSB index and a number of SSBs within the pattern of SSBs ($N_{SSB}^{QCL}$). For example, the SSB beam index may be derived according to modulo(candidate SSB idx, $N_{SSB}^{QCL}$).

In another aspect, the plurality of SSBs may include a pattern of SSBs, and the base station may sequentially repeat transmission of each SSB of the pattern of SSBs N times within the pattern of SSBs, N being an integer number greater than or equal to 2, e.g., as described in connection with FIG. 9. For example, the base station may transmit a first SSB and a repetition of the first SSB prior to transmitting a second SSB within the extended DRS transmission window. The UE may determine the SSB index of each candidate SSB of the plurality of candidate SSBs using a modulo function that is based on a floor of a candidate SSB index divided by N, and a number of SSBs within the pattern of SSBs ($N_{SSB}^{QCL}$). For example, the SSB beam index may be derived according to modulo $$\left(\text{floor}\left(\frac{\text{candidate } SSB \text{ } idx}{N}\right), N_{SSB}^{QCL}\right).$$

At 1408, the base station may transmit the plurality of SSBs based on the scheduling of the plurality of SSBs in the extended DRS transmission window. The base station may transmit an SSB in each candidate of the extended DRS transmission window in some aspects. The transmission may be based on the base station successfully completing an LBT procedure. In some aspects, the base station may not be able to transmit the SSB in one or more of the SSB candidates, e.g., based on an unsuccessful LBT. For example, the base station 1004 may transmit up to 64×N SSBs based on the candidate SSBs in the DRS tx window, and the base station 1004 may repeat the transmission of the set of SSB beams/QCLs on the 64×N candidate SSBs within the DRS tx window. If the base station 1004 does not pass LBT in order to transmit an SSB in a first SSB candidate for an SSB index within the DRS tx window, the base station may transmit the SSB at an SSB candidate that is a repetition for the corresponding SSB index. For example, at 1016, the base station 1004 may transmit the plurality of SSBs based on the scheduling of the plurality of SSBs in the extended DRS transmission window. Furthermore, 1408 may be performed, e.g., by the transmission component 1634.

Figure 15:
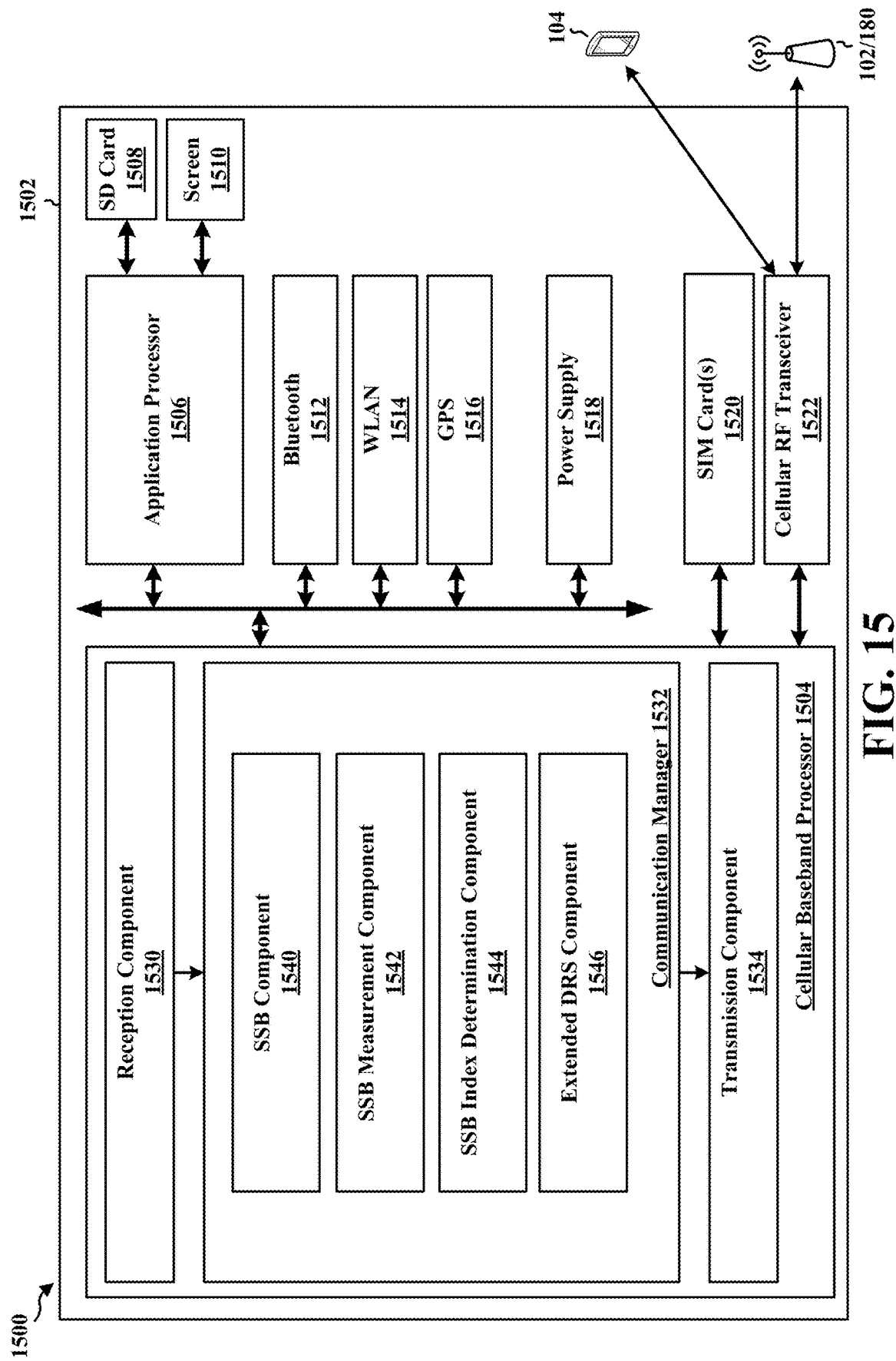
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes an SSB component 1540 configured to monitor for the plurality of SSBs in an extended DRS transmission window including a plurality of candidate SSBs including at least two candidate SSBs with a same SSB beam index, e.g., as described in connection with 1106 and 1206. The communication manager 1532 includes an SSB measurement component 1542 configured to perform measurements based on received SSBs from the plurality of SSBs e.g., as described in connection with 1108 and 1208. The communication manager 1532 includes an SSB index determination component 1544 configured to determine SSB index of the plurality of SSBs, e.g., as described in connection with 1104. The communication manager 1532 an extended DRS component 1646 configured to receive one or more parameters of extended DRS transmission window from a base station, e.g., as described in connection with 1102.

The apparatus may include additional components that perform each of the blocks of the algorithm in the flowcharts of FIGS. 10, 11, and 12. As such, each block in the flowcharts of FIGS. 10, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for monitoring for a plurality of SSBs in an extended DRS transmission window comprising a plurality of candidate SSBs including at least two candidate SSBs with a same SSB beam index; and means for performing measurements based on SSBs of the plurality of SSBs received from a base station. The apparatus 1502 includes means for receiving, from the base station, a signal indicating one or more scheduling parameters of the plurality of SSBs, the one or more scheduling parameters including at least one of a number of candidate SSBs within each of the sub-DRS transmission windows, a sub-DRS window length, or a number of sub-DRX transmission windows within the extended DRS transmission window. The apparatus 1502 includes means for receiving, from a base station, a signal indicating one or more scheduling parameters of the plurality of SSBs, the one or more scheduling parameters including at least one of N, or the number of SSBs within the pattern of SSBs and means for receiving, from a base station, a signal indicating one or more scheduling parameters of the plurality of SSBs, the one or more scheduling parameters including at least one of N, or the number of SSBs within the pattern of SSBs. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
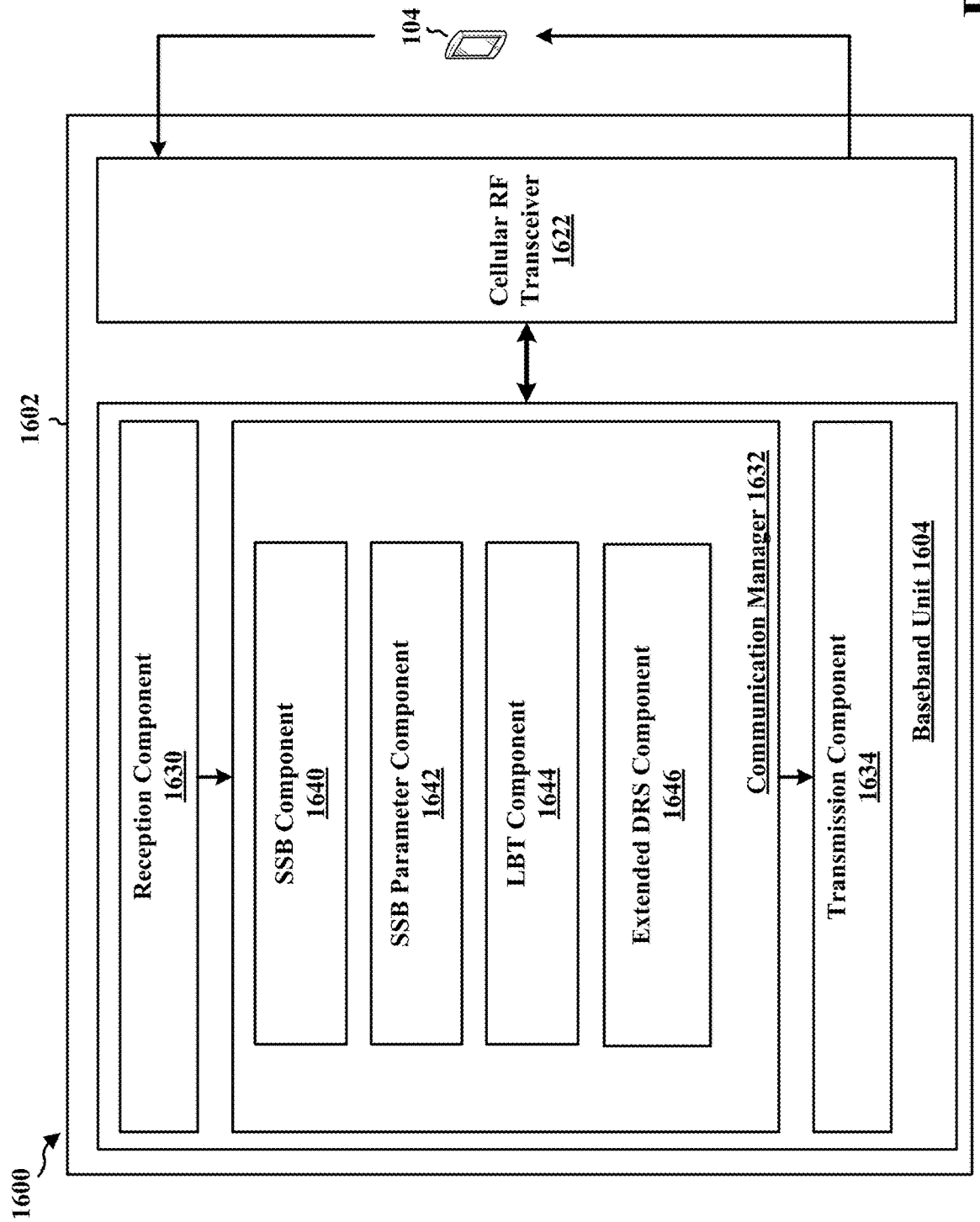
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1502 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes an SSB component 1640 configured to schedule a plurality of SSBs in an extended DRS transmission window including a plurality of candidate SSBs including at least two candidate SSBs with a same SSB beam index, e.g., as described in connection with 1304 and 1404. The communication manager 1632 includes an SSB parameter component 1642 that is configured to transmit one or more parameters of extended DRS transmission window to the UE, e.g., as described in connection with 1302. The communication manager 1632 includes an LBT component 1644 configured to perform an LBT procedure before transmitting the scheduled plurality of SSBs, e.g., as described in connection with 1306. The communication manager 1632 includes an extended DRS component 1646 configured to transmit the plurality of SSBs based on the scheduling of the plurality of SSBs in the extended DRS transmission window, e.g., as described in connection with 1308 and 1408.

The apparatus may include additional components that perform each of the blocks of the algorithm in the flowcharts of FIGS. 10, 13, and 14. As such, each block in the flowcharts of FIGS. 10, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for scheduling a plurality of SSBs in an extended DRS transmission window comprising a plurality of candidate SSBs including at least two candidate SSBs with a same SSB beam index; and means for transmitting the plurality of SSBs based on the scheduling of the plurality of SSBs in the extended DRS transmission window. The apparatus 1602 includes means for transmitting an indication of one or more of a number of candidate SSBs within each of the sub-DRS transmission windows, a sub-DRS window length, or a number of sub-DRX transmission windows within the extended DRS transmission window, and means for transmitting an indication of one or more of N or the number of SSBs within the pattern of SSBs. The apparatus 1602 includes means for performing an LBT procedure before transmitting the plurality of SSBs. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

The base station may schedule a plurality of SSBs in an extended DRS transmission window including a plurality of candidate SSBs including at least two candidate SSBs with a same SSB beam index, and transmit the plurality of SSBs based on the scheduling of the plurality of SSBs in the extended DRS transmission window. The UE may monitor for a plurality of SSBs in the extended DRS transmission window including the plurality of candidate SSBs including at least two candidate SSBs with the same SSB beam index, and perform measurements based on SSBs of the plurality of SSBs received from the base station. The base station may transmit a signal indicating one or more scheduling parameters of the plurality of SSBs, and the UE may determine SSB index of each candidate SSB of the plurality of candidate SSBs.

In one aspect, the extended DRS transmission window may include multiple sub-DRS transmission windows, each of the multiple sub-DRS transmission windows including at least one transmission of each of the plurality of SSBs. The base station may schedule to transmit a pattern of SSBs that is repeated in each sub-DRS transmission window of the extended DRS transmission window. The UE may determine the SSB index of each candidate SSB of the plurality of candidate SSBs based on a modulo function that is based on a candidate SSB index and a number of candidate SSBs within each sub-DRS transmission window. The one or more parameters may include one or more of the number of candidate SSBs within each of the sub-DRS transmission windows, a sub-DRS window length, or a number of sub-DRX transmission windows within the extended DRS transmission window.

In another aspect, the plurality of candidate SSBs may include N sets of candidate SSBs, N being an integer number greater than or equal to 2, and the base station may repeat transmission of a pattern of SSBs in the extended DRS transmission window. The UE may determine the SSB index of each candidate SSB of the plurality of candidate SSBs using a modulo function based on a candidate SSB index and a number of SSBs within the pattern of SSBs. The one or more parameters may include one or more of the integer N or the number of SSBs within the pattern of candidate SSBs.

In another aspect, the plurality of SSBs may include a pattern of SSBs, and the base station may sequentially repeat transmission of each SSB of the pattern of SSBs N times within the pattern of SSBs, N being an integer number greater than or equal to 2. For example, the base station may transmit a first SSB and a repetition of the first SSB prior to transmitting a second SSB within the extended DRS transmission window. The UE may determine the SSB index of each candidate SSB of the plurality of candidate SSBs using a modulo function that is based on a floor of a candidate SSB index divided by N, and a number of SSBs within the pattern of SSBs. The one or more parameters may include one or more of the integer N or the number of SSBs within the pattern of SSBs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a base station, the method including scheduling a plurality of SSBs in an extended DRS transmission window including a plurality of candidate SSBs including at least two candidate SSBs with a same SSB beam index, and transmitting the plurality of SSBs based on the scheduling of the plurality of SSBs in the extended DRS transmission window.

Aspect 2 is the method of aspect 1, where the extended DRS transmission window includes multiple sub-DRS transmission windows, each of the multiple sub-DRS transmission windows including at least one transmission of each of the plurality of SSBs.

Aspect 3 is the method of aspect 2, where the plurality of SSBs has a pattern of SSBs that is repeated in each sub-DRS transmission window of the extended DRS transmission window.

Aspect 4 is the method of any of aspects 2 and 3, where SSB index of each candidate SSB of the plurality of candidate SSB s is based on a modulo function that is based on a candidate SSB index and a number of candidate SSBs within each sub-DRS transmission window.

Aspect 5 is the method of any of aspects 2 and 4, further including transmitting an indication of one or more of a number of candidate SSBs within each of the sub-DRS transmission windows, a sub-DRS window length, or a number of sub-DRX transmission windows within the extended DRS transmission window.

Aspect 6 is the method of aspect 1, where the plurality of candidate SSBs includes N sets of candidate SSBs, N being an integer number greater than or equal to 2, and where the base station repeats transmission of a pattern of SSBs in the extended DRS transmission window.

Aspect 7 is the method of aspect 6, where SSB index of each candidate SSB of the plurality of candidate SSBs is determined using a modulo function based on a candidate SSB index and a number of SSBs within the pattern of SSBs.

Aspect 8 is the method of aspects 6 and 7, further including transmitting an indication of one or more of N, or the number of SSBs within the pattern of SSBs.

Aspect 9 is the method of aspect 1, where the plurality of SSBs includes a pattern of SSBs, and where the base station sequentially repeats transmission of each SSB of the pattern of SSBs N times, N being an integer number greater than or equal to 2.

Aspect 10 is the method of aspect 9, where a first SSB and a repetition of the first SSB are transmitted prior to transmitting a second SSB within the extended DRS transmission window.

Aspect 11 is the method of any of aspects 9 and 10, where SSB index of each candidate SSB of the plurality of candidate SSBs is determined using a modulo function that is based on a floor of a candidate SSB index divided by N, and a number of SSBs within the pattern of SSBs.

Aspect 12 is the method of aspect 11, further including transmitting an indication of one or more of N, or the number of SSBs within the pattern of SSBs.

Aspect 13 is the method of any of aspects 1 to 12, where the extended DRS transmission window is determined based on a SCS for the plurality of SSBs.

Aspect 14 is the method of any of aspects 1 to 13, where the plurality of SSBs is transmitted in an unlicensed spectrum.

Aspect 15 is the method of aspect 14, further including performing an LBT procedure before transmitting the plurality of SSBs.

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a computer-readable medium storing computer executable code, where the code when executed by a processor causes the processor to implement a method as in any of aspects 1 to 15.

Aspect 19 is a method of wireless communication of a UE, the method including monitoring for a plurality of SSBs in an extended DRS transmission window including a plurality of candidate SSBs including at least two candidate SSBs with a same SSB beam index, and performing measurements based on SSBs of the plurality of SSBs received from a base station.

Aspect 20 is the method of aspect 19, where the extended DRS transmission window includes multiple sub-DRS transmission windows, each of the multiple sub-DRS transmission windows including at least one transmission of each of the plurality of SSBs.

Aspect 21 is the method of aspect 20, where the plurality of SSBs is monitored based on a pattern of SSBs that is repeated in each sub-DRS transmission window of the extended DRS transmission window.

Aspect 22 is the method of any of aspects 20 and 21, where the SSB index of each candidate SSB of the plurality of candidate SSBs is based on a modulo function that is based on a candidate SSB index and a number of candidate SSBs within each sub-DRS transmission window.

Aspect 23 is the method of any of aspects 20 and 22, further including receiving, from the base station, a signal indicating one or more scheduling parameters of the plurality of SSBs, the one or more scheduling parameters including at least one of a number of candidate SSBs within each of the sub-DRS transmission windows, a sub-DRS window length, or a number of sub-DRX transmission windows within the extended DRS transmission window, where the plurality of SSBs is monitored based on the one or more parameters received from the base station.

Aspect 24 is the method of aspect 19, where the plurality of candidate SSBs includes N sets of candidate SSBs, N being an integer number greater than or equal to 2, where the plurality of SSBs is monitored based on repeat transmissions of a pattern of SSBs in the extended DRS transmission window.

Aspect 25 is the method of aspect 24, where SSB index of each candidate SSB of the plurality of candidate SSBs is based on a modulo function that is based on a candidate SSB index and a number of SSBs within the pattern of SSBs.

Aspect 26 is the method of aspect 25, further including receiving, from a base station, a signal indicating one or more scheduling parameters of the plurality of SSBs, the one or more scheduling parameters including at least one of N, or the number of SSBs within the pattern of SSBs.

Aspect 27 is the method of aspect 19, where the plurality of SSBs includes a pattern of SSBs, and where the plurality of SSBs is monitored based on sequential repetitions of each SSB of the pattern of SSBs N times, N being an integer number greater than or equal to 2.

Aspect 28 is the method of aspect 27, where a first SSB and a repetition of the first SSB are monitored prior to monitoring for a second SSB within the extended DRS transmission window.

Aspect 29 is the method of any of aspects 27 and 28, where SSB index of each candidate SSB of the plurality of candidate SSBs is determined using a modulo function based on a floor of a candidate SSB index divided by N, and a number of SSBs within the pattern of SSBs.

Aspect 30 is the method of any of aspects 27 and 29, further including receiving, from a base station, a signal indicating one or more scheduling parameters of the plurality of SSBs, the one or more scheduling parameters including at least one of N, or the number of SSBs within the pattern of SSBs.

Aspect 31 is the method of aspect 19, where the plurality of SSBs is monitored in the extended DRS transmission window based on a SCS for the plurality of SSBs.

Aspect 32 is an apparatus for wireless communication including at least one processor coupled to a memory and configured to implement a method as in any of aspects 19 to 31.

Aspect 33 is an apparatus for wireless communication including means for implementing a method as in any of aspects 19 to 31.

Aspect 34 is a computer-readable medium storing computer executable code, where the code when executed by a processor causes the processor to implement a method as in any of aspects 19 to 31.

What is claimed is:

1. An apparatus for wireless communication at a base station, comprising:
   one or more memories; and
   one or more processors coupled to the one or more memories and configured, individually or collectively, to:
   schedule a plurality of synchronization signal blocks (SSBs) in an extended discovery burst (DRS) transmission window comprising a plurality of candidate SSBs including at least two candidate SSBs with a same SSB beam index; and
   transmit the plurality of SSBs based on the scheduling of the plurality of SSBs in the extended DRS transmission window, wherein the plurality of SSBs comprises a pattern of SSBs, and wherein the base station sequentially repeats transmission of each SSB of the pattern of SSBs N times, N being an integer number greater than or equal to 2, and wherein a first SSB and a repetition of the first SSB are transmitted prior to transmitting a second SSB within the extended DRS transmission window.

2. The apparatus of claim 1, wherein the extended DRS transmission window comprises multiple sub-DRS transmission windows, each of the multiple sub-DRS transmission windows including at least one transmission of each of the plurality of SSBs.

3. The apparatus of claim 2, wherein the plurality of SSBs has a pattern of SSBs that is repeated in each sub-DRS transmission window of the extended DRS transmission window.

4. The apparatus of claim 2, wherein SSB index of each candidate SSB of the plurality of candidate SSBs is based on a modulo function that is based on a candidate SSB index and a number of candidate SSBs within each sub-DRS transmission window.

5. The apparatus of claim 2, wherein the one or more processors are further configured, individually or collectively, to:
transmit an indication of one or more of:
a number of candidate SSBs within each of the multiple sub-DRS transmission windows,
a sub-DRS window length, or
a number of sub-DRX transmission windows within the extended DRS transmission window.

6. The apparatus of claim 1, wherein the plurality of candidate SSBs comprises N sets of candidate SSBs, N being an integer number greater than or equal to 2, and
wherein the base station repeats transmission of a pattern of SSBs in the extended DRS transmission window.

7. The apparatus of claim 6, wherein SSB index of each candidate SSB of the plurality of candidate SSBs is determined using a modulo function based on a candidate SSB index and a number of SSBs within the pattern of SSBs.

8. The apparatus of claim 7, wherein the one or more processors are further configured, individually or collectively, to:
transmit an indication of one or more of N or the number of SSBs within the pattern of SSBs.

9. The apparatus of claim 1, wherein SSB index of each candidate SSB of the plurality of candidate SSBs is determined using a modulo function that is based on a floor of a candidate SSB index divided by N, and a number of SSBs within the pattern of SSBs.

10. The apparatus of claim 9, wherein the one or more processors are further configured, individually or collectively, to:
transmit an indication of one or more of N, or the number of SSBs within the pattern of SSBs.

11. The apparatus of claim 1, wherein the extended DRS transmission window is determined based on a subcarrier spacing (SCS) for the plurality of SSBs.

12. The apparatus of claim 1, wherein the plurality of SSBs is transmitted in an unlicensed spectrum.

13. The apparatus of claim 12, wherein the one or more processors are further configured, individually or collectively, to:
perform a listen-before-talk (LBT) procedure before transmitting the plurality of SSBs.

14. An apparatus for wireless communication at a user equipment (UE), comprising:
one or more memories; and
one or more processors coupled to the one or more memories and configured, individually or collectively, to:
monitor for a plurality of synchronization signal blocks (SSBs) in an extended discovery burst (DRS) transmission window comprising a plurality of candidate SSBs including at least two candidate SSBs with a same SSB beam index; and
perform measurements based on SSBs of the plurality of SSBs received from a base station, wherein the plurality of SSBs comprises a pattern of SSBs, and wherein the plurality of SSBs is monitored based on sequential repetitions of each SSB of the pattern of SSBs N times, N being an integer number greater than or equal to 2, and wherein a first SSB and a repetition of the first SSB are monitored prior to monitoring for a second SSB within the extended DRS transmission window.

15. The apparatus of claim 14, wherein the extended DRS transmission window comprises multiple sub-DRS transmission windows, each of the multiple sub-DRS transmission windows including at least one transmission of each of the plurality of SSBs.

16. The apparatus of claim 15, wherein the plurality of SSBs is monitored based on a pattern of SSBs that is repeated in each sub-DRS transmission window of the extended DRS transmission window.

17. The apparatus of claim 15, wherein the SSB index of each candidate SSB of the plurality of candidate SSBs is based on a modulo function that is based on a candidate SSB index and a number of candidate SSBs within each sub-DRS transmission window.

18. The apparatus of claim 15, wherein the one or more processors are further configured, individually or collectively, to:
receive, from the base station, a signal indicating one or more scheduling parameters of the plurality of SSBs, the one or more scheduling parameters including at least one of:
a number of candidate SSBs within each of the multiple sub-DRS transmission windows,
a sub-DRS window length, or
a number of sub-DRX transmission windows within the extended DRS transmission window,
wherein the plurality of SSBs is monitored based on the one or more parameters received from the base station.

19. The apparatus of claim 14, wherein the plurality of candidate SSBs comprises N sets of candidate SSBs, N being an integer number greater than or equal to 2,
wherein the plurality of SSBs is monitored based on repeat transmissions of a pattern of SSBs in the extended DRS transmission window.

20. The apparatus of claim 19, wherein SSB index of each candidate SSB of the plurality of candidate SSBs is based on a modulo function that is based on a candidate SSB index and a number of SSBs within the pattern of SSBs.

21. The apparatus of claim 20, wherein the one or more processors are further configured, individually or collectively, to:
receive, from the base station, a signal indicating one or more scheduling parameters of the plurality of SSBs, the one or more scheduling parameters including at least one of N, or the number of SSBs within the pattern of SSBs.

22. The apparatus of claim 14, wherein SSB index of each candidate SSB of the plurality of candidate SSBs is determined using a modulo function based on a floor of a candidate SSB index divided by N, and a number of SSBs within the pattern of SSBs.

23. The apparatus of claim 22, wherein the one or more processors are further configured, individually or collectively, to:

receive, from the base station, a signal indicating one or more scheduling parameters of the plurality of SSBs, the one or more scheduling parameters including at least one of N, or the number of SSBs within the pattern of SSBs.

24. The apparatus of claim 14, wherein the plurality of SSBs in the extended DRS transmission window is monitored based on a subcarrier spacing (SCS) for the plurality of SSBs.

25. A method of wireless communication of a base station, comprising:
  scheduling a plurality of synchronization signal blocks (SSBs) in an extended discovery burst (DRS) transmission window comprising a plurality of candidate SSBs including at least two candidate SSBs with a same SSB beam index; and
  transmitting the plurality of SSBs based on the scheduling of the plurality of SSBs in the extended DRS transmission window, wherein the plurality of SSBs comprises a pattern of SSBs. and wherein the base station sequentially repeats transmission of each SSB of the pattern of SSBs N times, N being an integer number greater than or equal to 2, and wherein a first SSB and a repetition of the first SSB are transmitted prior to transmitting a second SSB within the extended DRS transmission window.

26. A method of wireless communication of a user equipment (UE), comprising:
  monitoring for a plurality of synchronization signal blocks (SSBs) in an extended discovery burst (DRS) transmission window comprising a plurality of candidate SSBs including at least two candidate SSBs with a same SSB beam index; and
  performing measurements based on SSBs of the plurality of SSBs received from a base station, wherein the plurality of SSBs comprises a pattern of SSBs, and wherein the plurality of SSBs is monitored based on sequential repetitions of each SSB of the pattern of SSBs N times, N being an integer number greater than or equal to 2, and wherein a first SSB and a repetition of the first SSB are monitored prior to monitoring for a second SSB within the extended DRS transmission window.

* * * * *